US011346482B2

(12) United States Patent
Tiberghien et al.

(10) Patent No.: US 11,346,482 B2
(45) Date of Patent: May 31, 2022

(54) FLUID COUPLING

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Francois Michel, Albertville (FR)

(73) Assignee: STAUBL FAVERGES, Faverges-Seythenex (FR)

( * ) Notice: Subject to any disclaimer, the term of this patent is extended or adjusted under 35 U.S.C. 154(b) by 0 days.

(21) Appl. No.: 17/163,688

(22) Filed: Feb. 1, 2021

(65) Prior Publication Data
US 2021/0247009 A1    Aug. 12, 2021

(30) Foreign Application Priority Data
Feb. 7, 2020 (FR) .................................. FR2001215

(51) Int. Cl.
*F16L 37/23* (2006.01)
*F16L 37/36* (2006.01)
(52) U.S. Cl.
CPC ............... *F16L 37/23* (2013.01); *F16L 37/36* (2013.01)
(58) Field of Classification Search
CPC .................................. F16L 37/23; F16L 37/36
(Continued)

(56) References Cited

U.S. PATENT DOCUMENTS 4,612,952 A * 9/1986 Fallon ...................... F16L 37/23
137/212
5,975,491 A   11/1999 Mann
(Continued)

FOREIGN PATENT DOCUMENTS

EP        0278420 A1    8/1988
GB         691568 A      5/1953
WO     2016091324 A1    6/2016

OTHER PUBLICATIONS

France Search Report dated Oct. 12, 2020, for France Application No. 2001215 filed Feb. 7, 2020.

*Primary Examiner* — Kevin L Lee

(57) ABSTRACT

A fluid coupling (R) comprising a male element (A) and a female element, a ring delimiting an inner channel of the female element (B), and a piston slidably mounted with respect to the ring (28) between a closed position and an open position of the inner channel. Between a disconnected configuration of the coupling and the connected configuration, the ring is moved rotationally with respect to the female body and the ring is held longitudinally in the female body, the piston is moved longitudinally from its closed position to its open position. The male body comprises an outer body and an inner body, the inner body delimiting an inner duct of the male element (A). During connecting, the outer body and the ring are rotationally fixed around the central longitudinal axis. In the connected configuration, the outer body and the ring are rotationally fixed. During connecting and in the connected configuration, the outer body and the inner body are free to rotate but unable to move in translation. The female element (B) comprises at least one locking device (45) movable between a position locking the rotation of the ring, and a release position, and in the disconnected configuration, the locking device (45) does not prevent the rotation of the ring.

16 Claims, 25 Drawing Sheets

(58) Field of Classification Search
USPC .......................................... 137/614.03, 614.04
See application file for complete search history.

(56) References Cited

U.S. PATENT DOCUMENTS

| | | | |
|---|---|---|---|
| 6,408,880 B1 * | 6/2002 | Kaul ....................... | F16L 37/23 |
| | | | 137/614.05 |
| 8,430,139 B2 * | 4/2013 | Pell et al. ........... | A01M 7/0082 |
| | | | 141/351 |
| 9,528,650 B2 * | 12/2016 | Tiberghien et al. .. | F16L 37/086 |

* cited by examiner

FLUID COUPLING

The present invention relates to a fluid coupling.

GB 691,568 describes a coupling wherein a female element comprises a female body, a piston forming a longitudinally movable valve and a ring rotatable with respect to the female body. The piston is in a helical connection with the female body, i.e. is rotatable with respect to the female body via rollers and a helical groove, and is rotationally fixed to the rotating ring and with respect to this, is slidably connected to it. When connecting the coupling, the piston is moved to its open position by the rotating ring driven in rotation by the male body of the coupling, by means of a helical connection between the female body and the piston, and the female body engages in a groove with a circumferential portion of the male body for axial connection of the male and female bodies.

In this coupling, any torsion between the pipes attached to the two connecting elements in the connected configuration may cause the coupling to disconnect.

In addition, the seals used in this coupling are elastomeric O-rings ("packing ring 30 of rubber or like flexible and resilient material") which are easily deformable and are not suitable for certain applications, such as cryogenic applications.

The object of the invention is to limit the risks of untimely opening and closing of the piston in a coupling adapted in particular to cryogenics.

To this end, the invention relates to a fluid coupling comprising a male element and a female element capable of fitting together along a central longitudinal axis of the coupling, the male element having a male body forming at least one connecting groove, this connecting groove comprising a longitudinal inlet portion which opens on a front face of the male element, and a circumferential portion, the female element comprising:

- a female body forming a receiving volume of the male body, and comprising at least one connecting pin extending into the receiving volume, and capable of engaging with the circumferential portion of the connecting groove in a connected configuration of the coupling, the female body also comprising at least one guide groove comprising a portion inclined with respect to a circumferential direction and with respect to a longitudinal direction,
- a piston comprising at least one guide pin projecting radially from the piston, the guide pin being engaged in the guide groove,
- a ring interposed radially between the piston and the female body and delimiting an inner channel of the female element, the piston being prevented from rotating with respect to the ring but mounted so as to be longitudinally slidable with respect to the ring between a position closing the inner channel, wherein the piston and the ring engage in a sealed manner, and a position opening the inner channel, the coupling comprises a seal interposed radially between the ring and the male body in the connected configuration of the coupling, between a disconnected configuration of the coupling and a connected configuration, the ring is rotated with respect to the female body around the longitudinal axis of the coupling according to one connecting direction and the ring is held longitudinally in the female body, and the piston is moved longitudinally from its closed position to its open position.

The male body comprises an outer male body and an inner male body, the inner male body delimiting an inner duct of the male element, the outer male body carrying the connecting groove, wherein, during connecting, the outer male body and the ring are rotationally fixed around the central longitudinal axis, wherein, in the connected configuration, the outer male body and the ring are integral in rotation around the central longitudinal axis wherein, during connecting and in the connected configuration, the outer male body and the inner male body are free to rotate with respect to each other around the longitudinal axis but have no translational mobility relative to each other along the longitudinal axis, wherein the female element comprises at least one locking device movable in the female body, in the connected configuration of the coupling, between a locked position, wherein the locking device prevents rotation of the ring with respect to the female body around the longitudinal axis in a disconnecting direction, and a release position, wherein the locking device does not prevent rotation of the ring according to the disconnecting direction, and that in the disconnected configuration, the locking device does not prevent the rotation of the ring according to the connecting direction.

Thanks to the invention, the coupling can be locked in the connected configuration while limiting the risks associated with torsion of the pipes connected to the coupling.

According to advantageous but not mandatory aspects of the invention, such a coupling may incorporate one or more of the following features, taken according to any technically permissible combination:

The connecting groove comprises an intermediate portion inclined according to a circumferential direction and a longitudinal direction, located between the circumferential portion and the longitudinal entry portion of the connecting groove, the guide groove comprises a circumferential portion which opens into the inclined portion of the guide groove and, during connecting, the angular stroke around the longitudinal axis of the guide pin in the circumferential portion corresponds to the angular stroke around the longitudinal axis of the connecting pin in the inclined intermediate portion of the connecting groove and the movement of the ring with respect to the male body from a first longitudinal position, where the ring and the male body are unable to form a seal, to a second longitudinal position, where the ring and the male body are able to form a seal with the seal.

The male body comprises at least one ring of balls interposed between the inner male body and the outer male body for rotational freedom with respect to the inner male body and outer male body around the central longitudinal axis.

The seal comprises a U-shaped polymer body and a reinforcement mounted radially between the two legs of the U-shape, the U-shape being open towards the rear of the connecting element among the male or female element wherein the seal is housed.

The connecting pin is set back from a front face of the ring, the connecting pin preferably extending back from the front face of the ring by a longitudinal distance greater than 0.6 times an inner diameter of the female body delimiting the receiving volume of the male body in the female element.

The ring comprises a drive pin set back from a front face of the ring, this drive pin being engaged in the connecting groove to secure the outer male body to the ring in rotation around the central longitudinal axis during connecting and in the connected configuration, the seal is housed in the male body and engages with an outer radial surface of the ring in a connected configuration and a longitudinal distance between the drive pin and a front end of the outer radial surface of the ring is less than a longitudinal distance between the seal and a front face of the male outer body.

In the disconnected configuration of the coupling, the, or each locking device is in the release position, and the release position is a stable position.

The locking device is arranged in an orthoradial groove in the female body, passing through the female body from side to side, and the female body comprises an operating device arranged outside the female body for controlling the movement of the locking device from the locking position to the release position.

The, or each locking device is integral with the female body in rotation around the longitudinal axis, the, or each locking device is in contact, in the locking position, with a flat portion of the ring which is recessed from an outer radial surface of the ring, and in the release position, the, or each locking device is entirely disposed outside a cylindrical volume delimiting the longitudinal axis by this outer radial surface.

The locking device is a rod which comprises a notch recessed in an outer surface of the rod and the rod is rotatable with respect to the female body, around an axis inclined with respect to a longitudinal direction, between the release position wherein the notch faces the ring and does not interfere with the rotation of the ring, and the locking position wherein the outer surface of the rod is in contact with the flat portion of the ring.

The locking device is integral with an operating device formed by a lever, which is rotatable with respect to the female body between the release position and the locking position of the locking device and comprises two flanges arranged in a clevis around the female body.

The female body forms an outer longitudinal shoulder that engages with an inner shoulder of the lever in the locking position to slow down the movement of the lever towards the release position of the locking device.

The male element comprises a valve that is spring biased to a position closing the inner duct of the male element, during connecting, this valve is moved by the piston to a position opening the inner duct of the male element, and a terminal notch of the guide groove, wherein the guide pin is engaged in a connected configuration, is configured so that the movement of the piston has a longitudinal overtravel between its open position in the connected configuration and its closed position.

The guide pin passes radially through a longitudinal groove in the ring in a position wherein the guide pin and the ring engage for longitudinal sliding of the ring with respect to the piston, this longitudinal groove opening at the rear of the ring.

The outer male body comprises inner radial surfaces that are stepped, and the ring comprises outer radial surfaces that are stepped so that during connecting, the stepped outer radial surfaces and the stepped inner radial surfaces engage in pairs.

The invention will be better understood, and other advantages of the invention will appear more clearly in the light of the description that will follow of a coupling that conforms to its principle, made as a non-limiting example with reference to the attached drawings wherein:

FIG. 1 shows a male connecting element A. The male element A is configured to fit into a female connecting element B to form a fluid coupling R.

Figure 1:
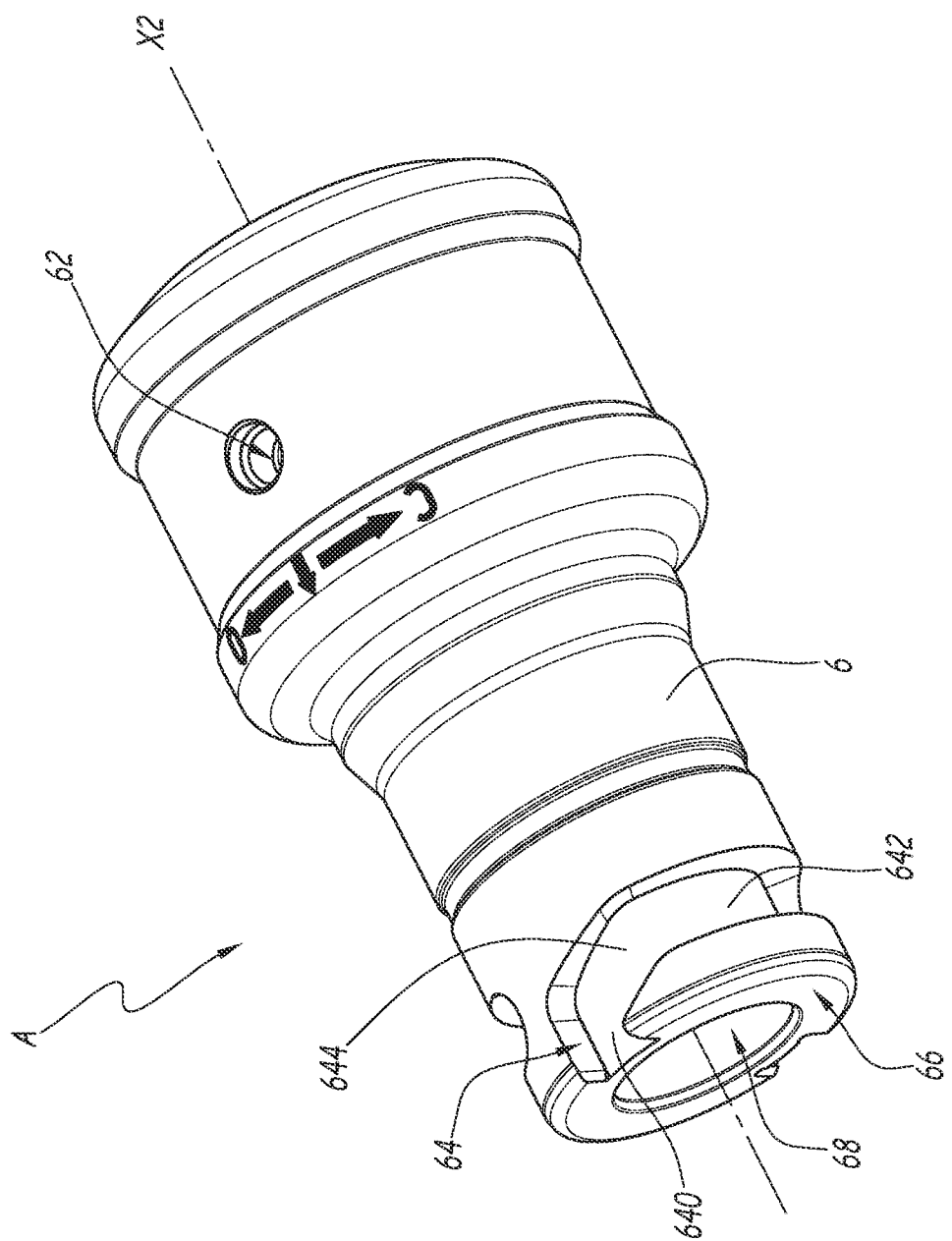
FIG. 1 is a perspective view of a male element of a coupling according to the invention.

In the following, the terms "axial" and "longitudinal" refer to directions parallel to a central longitudinal axis of either the male element A, the female element B, or the coupling R. An axial surface is a surface perpendicular to a longitudinal axis. The term "radial" refers to a direction perpendicular to a central longitudinal axis and passing through this axis. A radial surface is a cylindrical surface surrounding a central longitudinal axis. The term "orthoradial" refers to a direction perpendicular to a radial direction and to a longitudinal direction. In other words, the orthoradial direction is tangential to a cylindrical surface of circular cross-section centered on the central longitudinal axis. The term "circumferential" means a curved direction following a circle centered on a central longitudinal axis and surrounding this axis.

The terms "front" and "rear" refer to, from the point of view of the male element A and its constituent parts, the longitudinal sides facing the female element B and opposite the female element B respectively. From the point of view of the female element B and its constituent parts, the terms "front" and "rear" refer to the longitudinal sides facing and opposite to the male component A, respectively.

The male element A comprises a male body 2 extending according to a central longitudinal axis X2 and formed by an inner male body 4 and an outer male body 6 surrounding the inner male body 4 and extending forward of the inner male body 4.

The outer body 6 is rotatably mounted around the central longitudinal axis X2 with respect to the inner male body 4, and the male body 2 comprises a ring of balls 8 interposed between the inner male body 4 and the outer male body 6 which allows the relative rotation of the bodies 4 and 6 around the central longitudinal axis X2. The balls 8 are engaged in an outer circumferential groove 40 of the inner male body 4 and an inner circumferential groove 60 of the outer male body 6. The male element A comprises a threaded passage 62 through the outer male body 6, through which the balls 8 are inserted into the grooves 40 and 60, and which is then plugged by a screw 10 inserted into the threaded passage 62 from a outer radial surface of the outer male body 6. The balls 8 join the outer male body 6 and the inner male body 4 in translation according to the central longitudinal axis X2. In other words, no axial translational mobility is possible between the outer male body 6 and the inner male body 4 according to the axis X2.

The front part of the outer male body 6 has two connecting grooves 64 each formed by a longitudinal inlet portion 640, a circumferential portion 642 and an intermediate portion 644 inclined according to an angle of 50° with respect to a longitudinal direction delimited by the central longitudinal axis X2. The intermediate portion 644 is also inclined with respect to the circumferential direction and forms a helical portion. The intermediate portion 644 is located between the longitudinal inlet portion 640 and the circumferential portion 642. The longitudinal inlet portion 640 opens to the front of the outer male body 6, formed by a front face 66. The two connecting grooves 64 are diametrically opposed with respect to the central longitudinal axis X2 and open onto the outer radial surface of the outer male body 6.

The inner male body 4 forms an inner duct 42 of the male element A.

Figure 2:
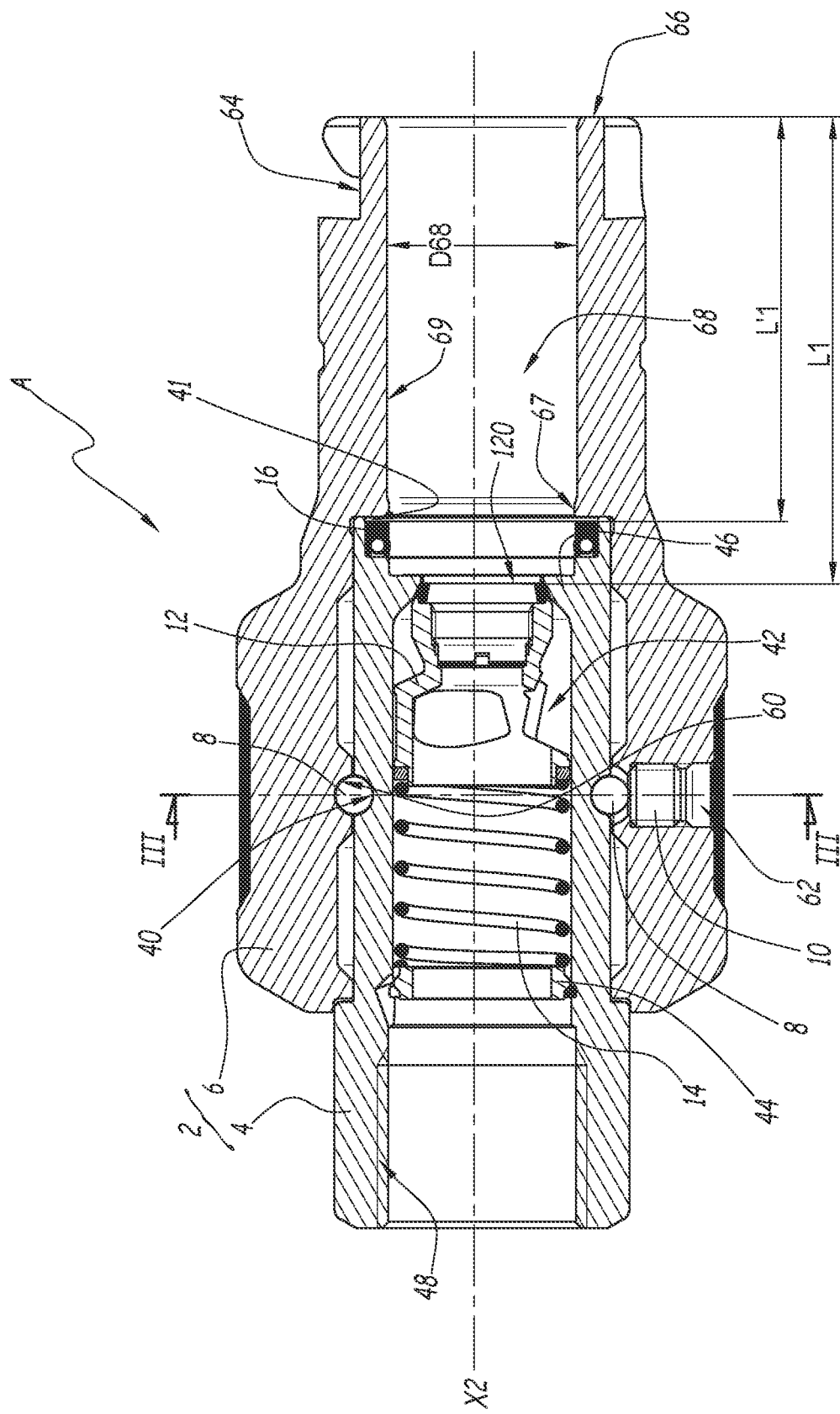
FIG. 2 is a longitudinal section of the male element of FIG. 1.
Figure 3:
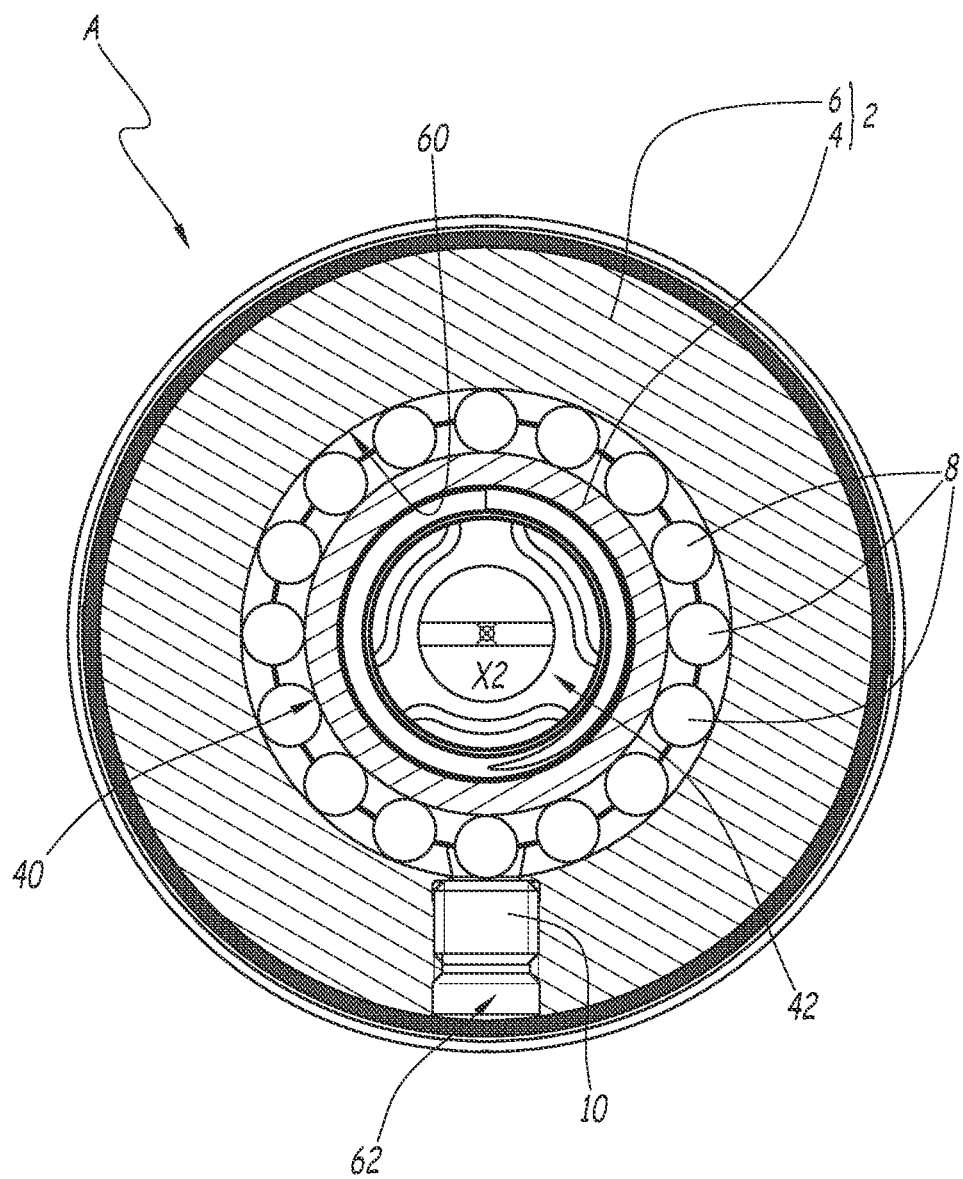
FIG. 3 is a section of the male element according to Plan III-III in FIG. 2.

The inner male body 4 houses a valve 12 mounted in the inner duct 42 and biased by a spring 14 to a forward closed position of the male element A (FIG. 2). The spring 14 is mounted between the valve 12 and a ring 44 fixed manner according to the X2 axis in the inner male body 4. In the closed position, the valve 12 engages with a sealing surface of the inner male body 4 at the level of the seat 46 of the inner male body 4 formed by a reduction in the diameter of the inner duct 42.

In front of the seat 46, the outer male body 6 forms an inner volume 68. In the closed position, a front face 120 of the valve 12 is set back from the front face 66 of the outer male body 6 by a longitudinal distance L1 greater than an inner front diameter D68 of the inner volume 68 of the outer male body 6, preferably more than twice the inner front diameter D68. In the closed position, the seal 16 is set back from the front face 66 of the outer male body 6 by a longitudinal distance L'1 greater than an inner front diameter D68 of the inner volume 68 of the outer male body 6, preferably greater than twice the inner front diameter D68.

At the rear of the inner male body 4, the male element A includes a thread 48 which allows the connection of the inner male body 4 to a pipe not shown.

Figure 18:
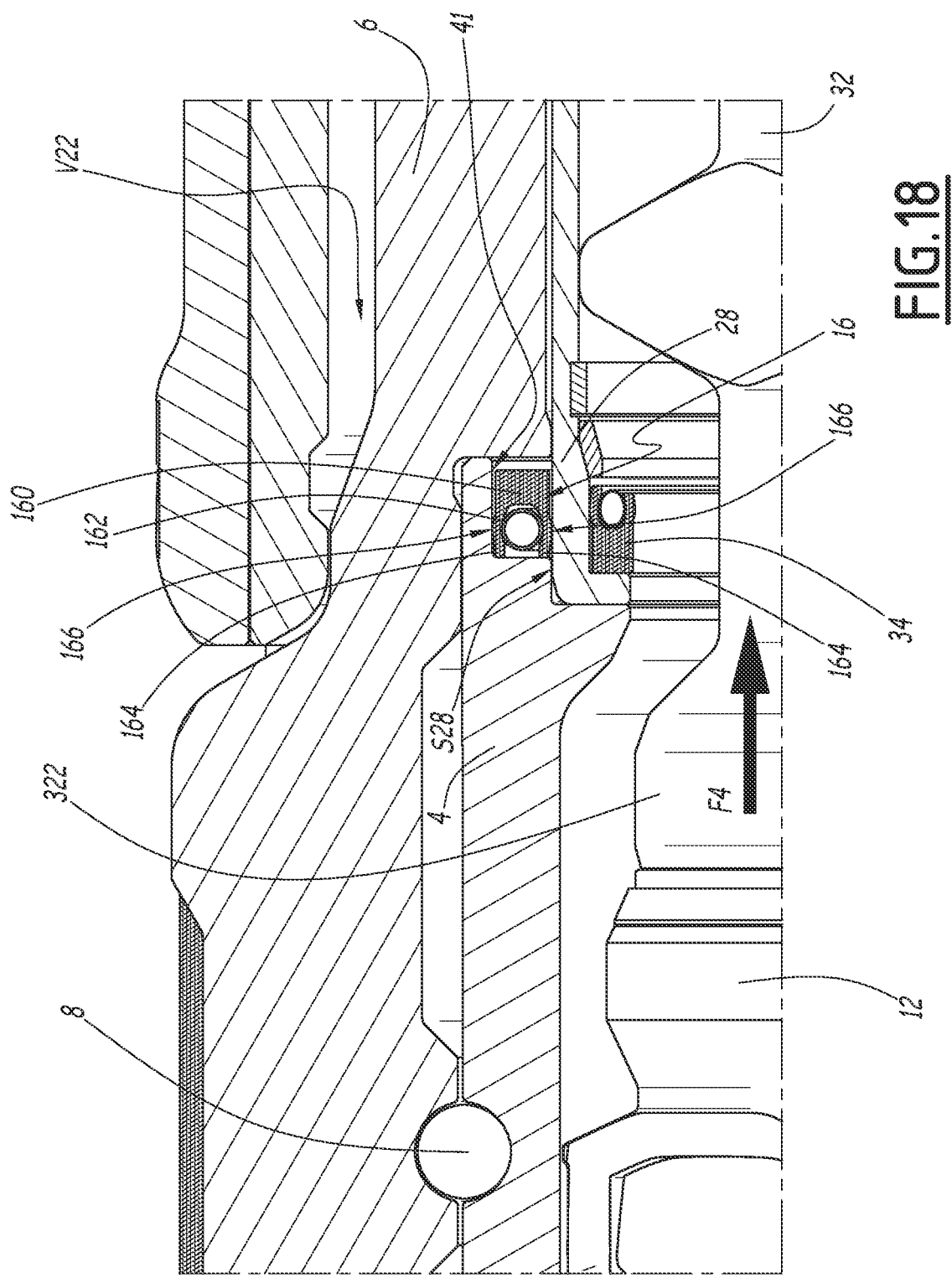
FIG. 18 is an upper part, at larger scale, of a section similar to FIG. 15, in a third connecting phase.

The male body 2 comprises an inner groove 41 delimited at the rear and radially by the inner male body 4 and at the front by the outer male body 6, and located in front of the seat 46. In this inner groove 41 is housed a seal 16 formed by a U-shaped elastomeric body 160 with a reinforcement 162, for example metal, which can be, for example, a toroidal shaped helical spring. The seal 16 is also visible on a larger scale in FIG. 18. The U-shape is open towards the rear of the male body 2 and comprises of two legs 164, each forming a radial bulge 166 located axially at the level of the reinforcement 162 and at a distance from the ends of the two legs 164. The reinforcement 162 is arranged radially between the two legs 164, which are spaced apart by the reinforcement 162, one outwardly and the other inwardly, with respect to the central longitudinal axis X2, so as to exert pressure forces which respectively press the two radial bulges 166 against the male body 2, at the level of the inner male body 4, and against part of the female element B when the latter is introduced into the inner volume 68.

Figure 4:
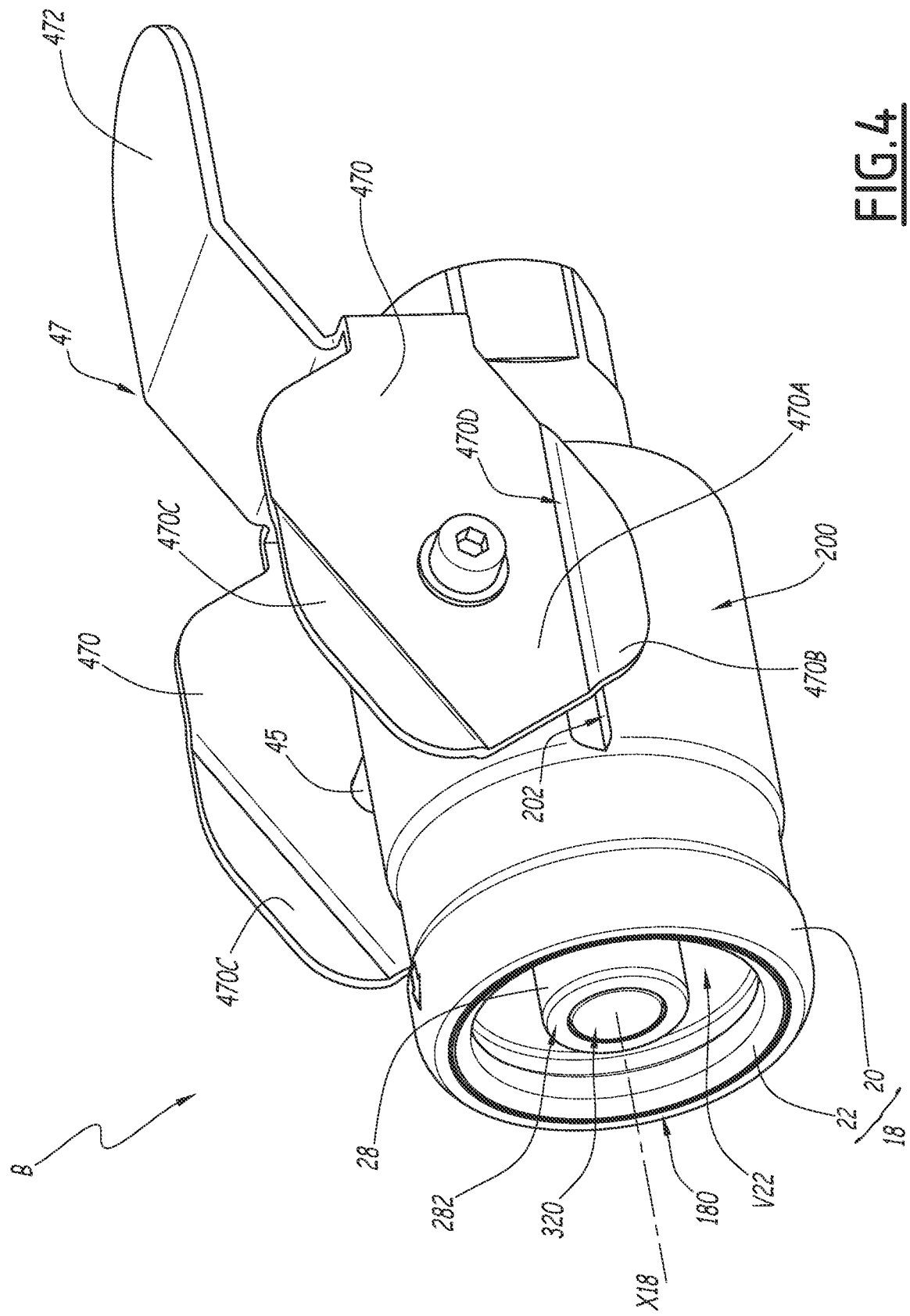
FIG. 4 is a perspective view of a female element of the coupling according to the invention.
Figure 5:
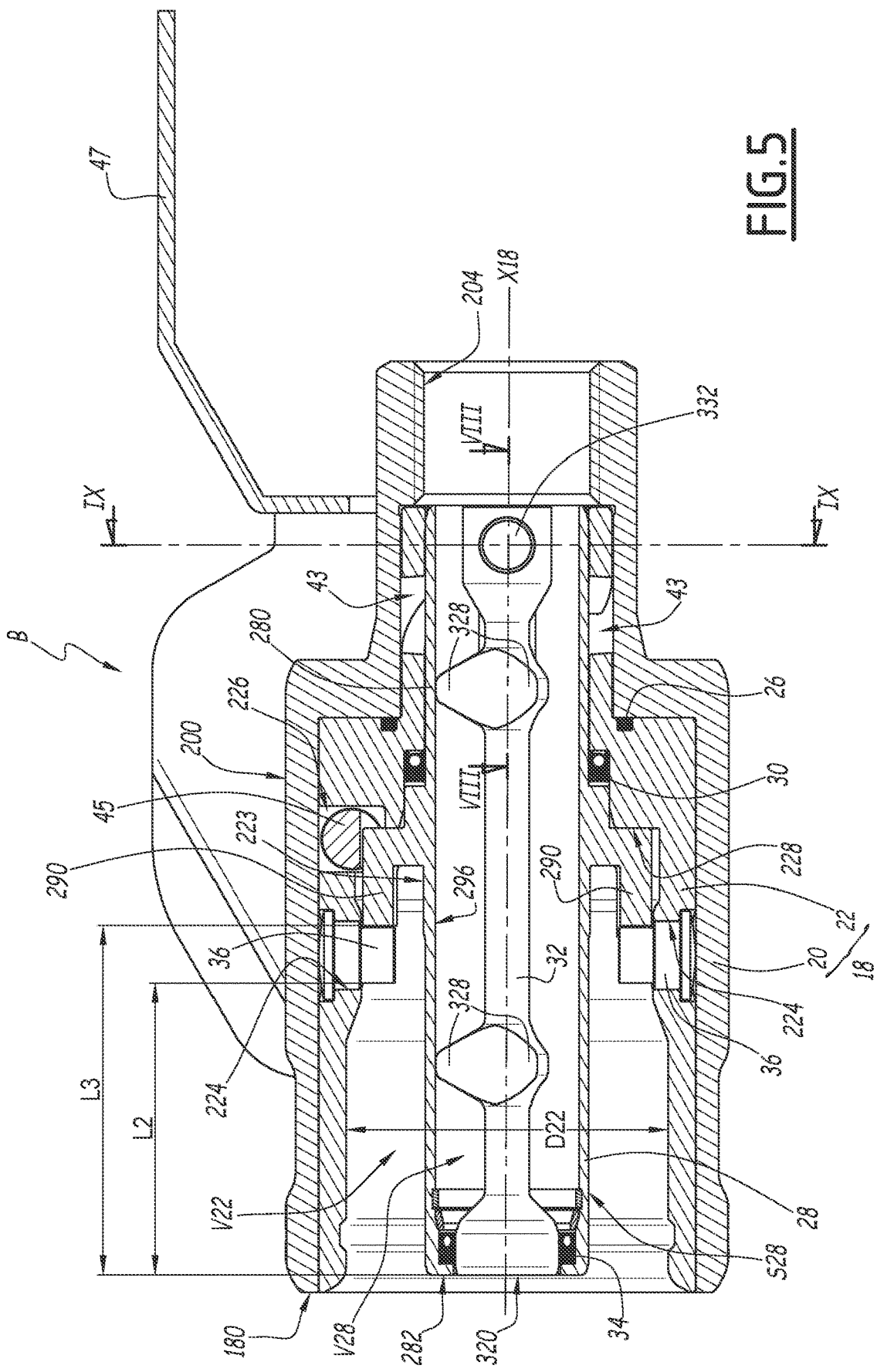
FIG. 5 is a longitudinal section of the female part of FIG. 4.
Figure 6:
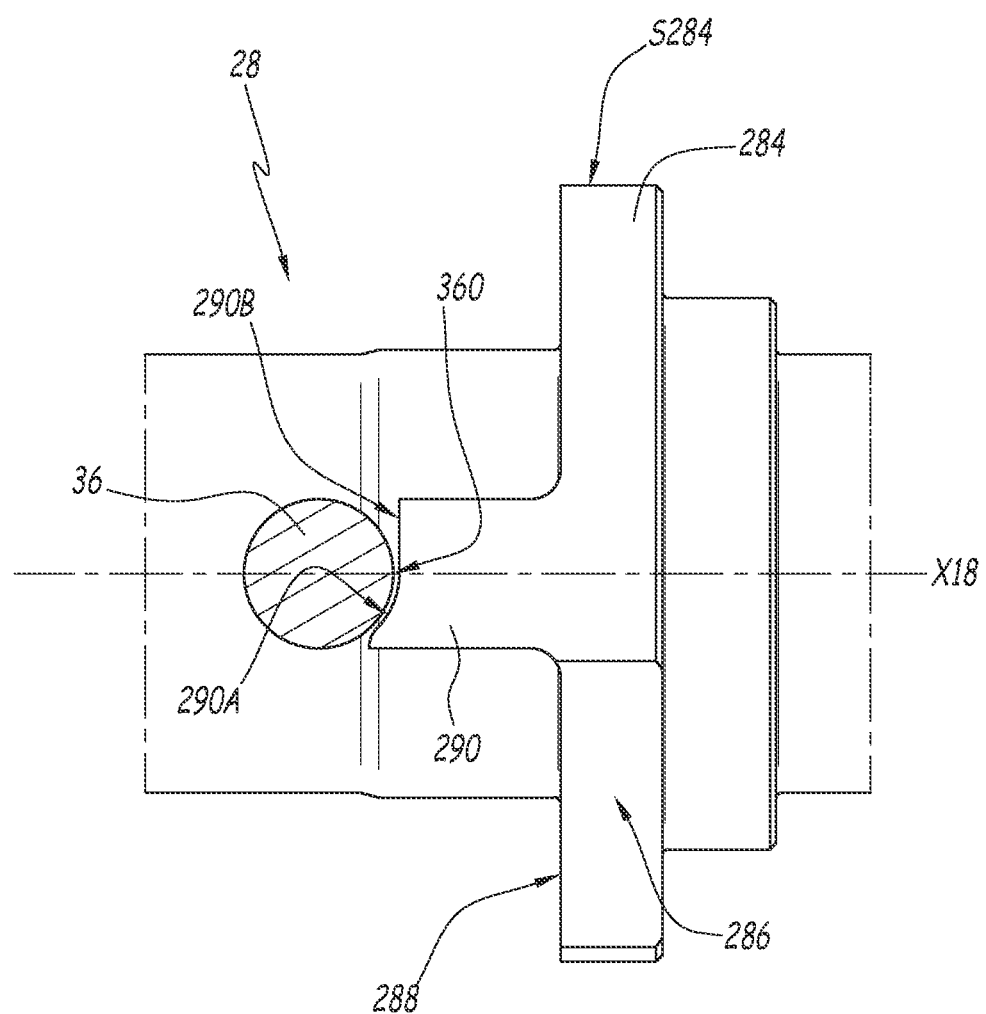
FIG. 6 is a top view of a part of the female element of FIG. 5.
Figure 7:
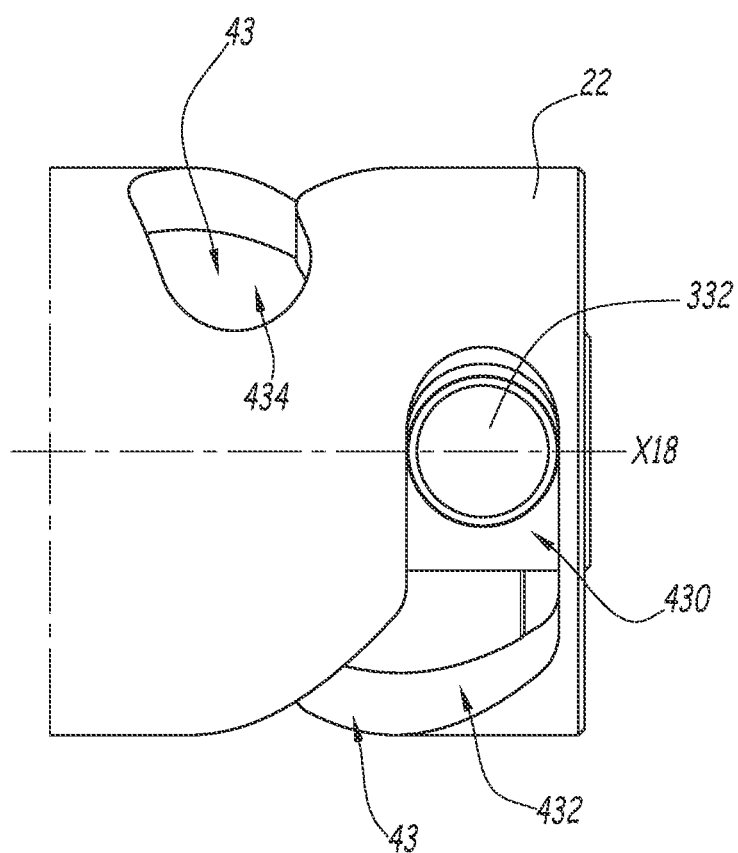
FIG. 7 is a side view of a guide groove of an inner female body of the female element.
Figure 12:
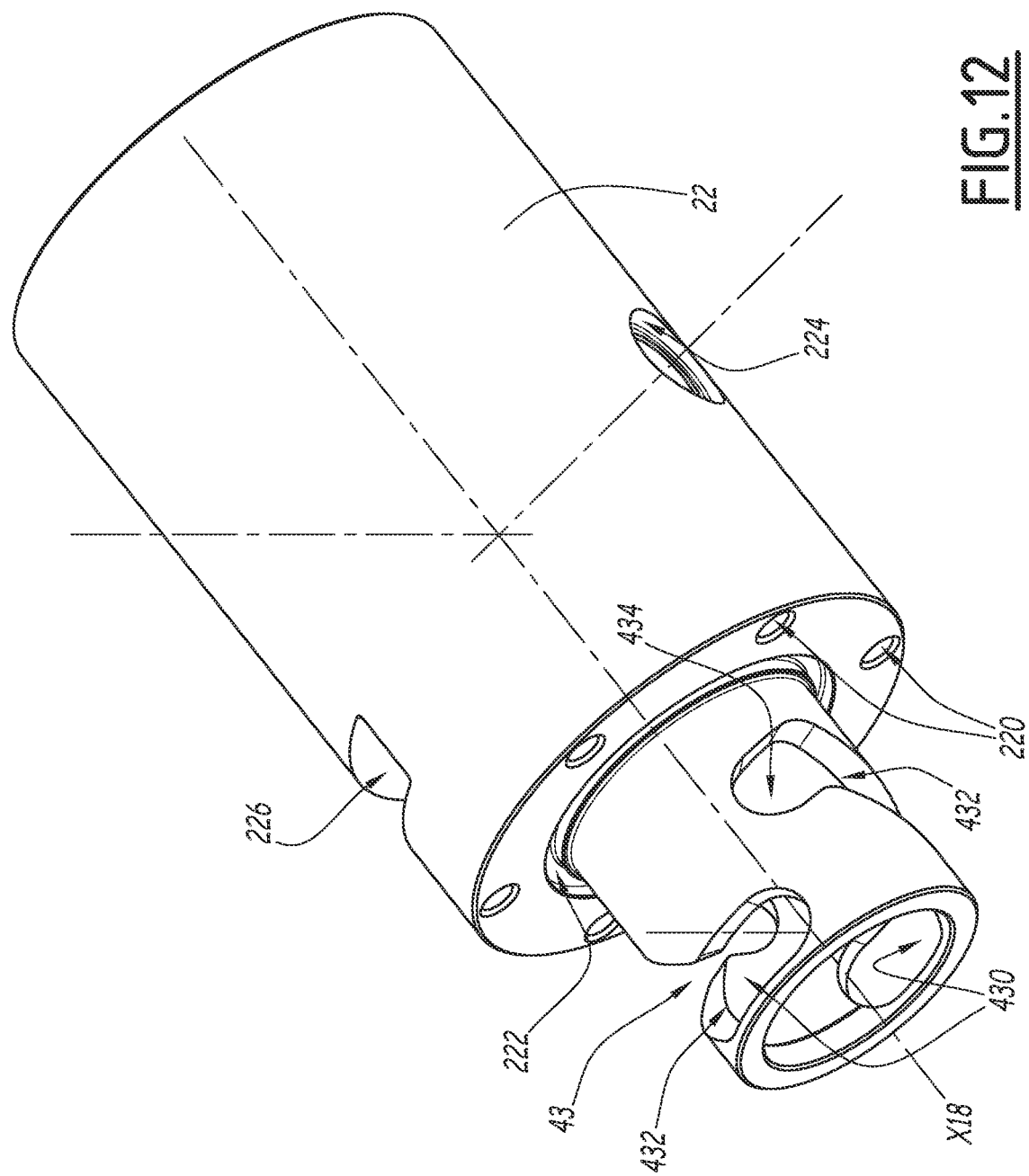
FIG. 12 is a perspective view from the back and underside of the outer female body of the female element of FIG. 11.

The female element B of the coupling R is shown in FIGS. 4 and 5. It comprises a female body 18, formed by an outer female body 20 and an inner female body 22, both of which are tubular and centered on a central longitudinal axis X18. The outer female body 20 is fixed in rotation and translation with respect to the inner female body 22 by several screws 24 engaged through the outer female body 20 in tapped holes 220 of the inner female body 22, visible in FIG. 12.

The female element B comprises a seal 26 interposed between the inner female body 22 and the outer female body 20. This seal 26 is disposed in a groove 222 of an outer axial surface of the inner female body 22 on which the tapped holes 220 are provided and which faces an inner axial surface of the outer female body 20. The seal 26 provides axial sealing.

The rear part of the outer female body 20 comprises a thread 204 for connection to a pipe not shown.

The outer female body 20 presents an outer radial surface 200 which comprises two parts 200A and 200B each extending over a half-circumference and delimited by two longitudinal grooves each forming a longitudinal shoulder 202.

The female part B comprises a ring 28 housed in the female body 18 and configured to rotate in the female body 18 around the central longitudinal axis X18. The inner female body 22 surrounds the ring 28, i.e. it extends radially on the outside of the ring 28, radially leaving an annular volume V22 between the inner female body 22 and the ring 28, to accommodate the male body 2 when the latter is fitted into the female element B.

The female element B comprises a seal 30 which is interposed between the inner female body 22 and the ring 28. The seal 30 provides a radial seal between the inner female body 22 and a rear tubular part 280 of the ring 28.

Preferably, the seal 30 comprises a U-shaped elastomeric body and a reinforcement similar to the seal 16.

The female part B also includes a piston 32. The ring 28 forms an inner channel V28 wherein the piston 32 is housed. The ring 28 radially surrounds the piston 32. The female element B comprises a sealing ring 34 that provides a radial seal between the piston 32 and the ring 28, in a closed position of the inner channel V28 (FIG. 5). In this closed position of the piston 32, the piston 32 and the ring 28 thus engage in a sealed manner. In this position, a flat front face 282 of the ring 28 is axially aligned with a flat front face 320 of the piston 32. The seal 34 is housed in the ring 28.

The female element B comprises two radial connecting pins 36, arranged at 180° to each other around the central axis X18. The connecting pins 36 are engaged in the holes 224 in the inner female body 22 and are held there by overlapping the outer female body 20 on the outside of the connecting pins 36. The connecting pins 36 extend radially into the receiving volume V22. The connecting pins 36 are arranged behind the front face 282 of the ring 28. Each connecting pin 36 is set back towards the rear of the female element B of a front face 180 of the female body 18 and in particular is set back towards the rear of the female element B of the flat front face 282 of the ring 28 by a longitudinal distance L2. The distance L2 is more than 0.6 times, preferably more than 0.75 times, an inner diameter D22 of the inner female body 22, which defines the receiving volume V22 of the male element A in front of the connecting pins 36.

The ring 28 comprises a cylindrical collar 284 delimited by an outer radial surface S284 which is cylindrical and centered on the longitudinal axis X18 and wherein two flats 286 are recessed, parallel to each other and extending in a direction orthoradial to the axis X18.

Figure 13:
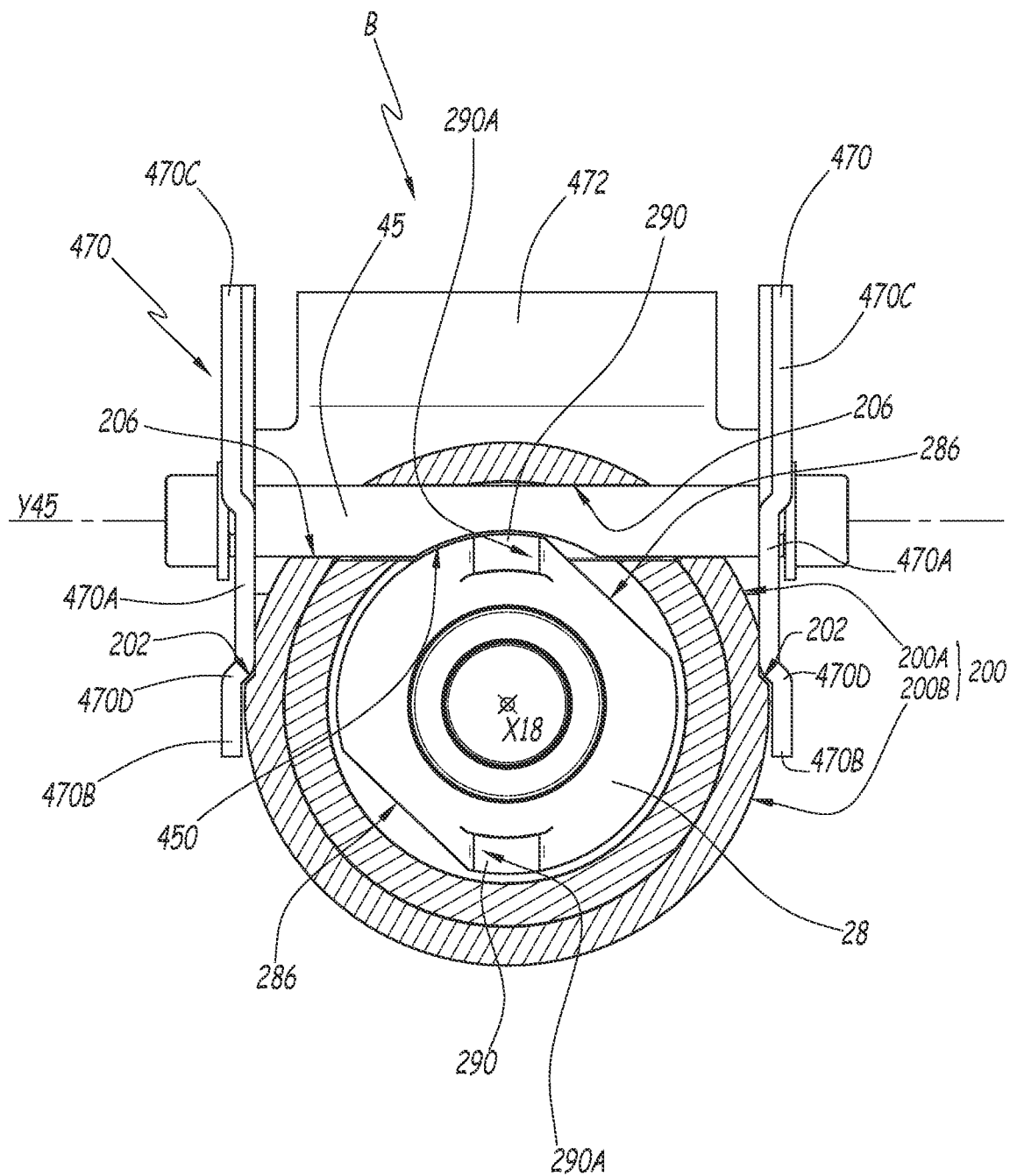
FIG. 13 is a cross section of the female element with an operating lever in the release position.

The collar 284 presents a front face 288 which forms the base of two longitudinal teeth that form two drive pins 290. In an orthoradial plane, the section of the drive pins 290 comprises a curved surface 290A which is oriented counterclockwise when looking at the drive pin 290 as seen in FIG. 13. The drive pins 290 also comprise a forward-facing flat surface 290B, which is substantially aligned, according to the longitudinal direction, with an outer rear surface 360 of the connecting pin 36 in a disconnected configuration.

The ring 28 comprises two longitudinal grooves 292 which pass radially through the ring 28 and which open into a rear face 294 of the ring 28 but are limited towards the front.

As can be seen in FIG. 5, the ring 28 does not protrude longitudinally from the female body 18, neither on the front face nor on the rear face of the female element B. This ensures that possible impacts with the male element A are mainly absorbed by the female body 18, which protects a cylindrical outer radial surface S28 of the ring 28, which forms the sealing surface of ring 28 with the male body 2 (see FIG. 18).

In addition, an operator does not have access to the drive pins 290 nor the connecting pins 36 to rotate the ring 28 relative to the female body 18, which would cause piston 32 to open in the disconnected configuration.

Each drive pin 290 is longitudinally spaced from the front face 282, which forms the front end of the sealing surface of the ring 28 by a distance L3, which is less than the distance L'1, which is the longitudinal distance in the male element A between the seal 16 and the front face 66 of the outer male body 6. This ensures that the ring 28 is not rotated relative to the female body 18 by the male element A other than by the drive pins 290 engaged in the connecting grooves 64.

A rear part of the inner female body 22 comprises two guide grooves 43 which pass radially through the inner female body 22 and are covered radially on the outside by the outer female body 20. These two guide grooves 43 are diametrically opposed with respect to the central longitudinal axis X18.

Each guide groove 43 comprises a circumferential portion 430, an inclined intermediate portion 432 and a terminal notch 434, with the inclined intermediate portion 432 being located between the circumferential portion 430 and the terminal notch 434. The inclined intermediate portion 432 is inclined with respect to the longitudinal direction and the circumferential direction and forms a helical portion. The terminal notch 434 is inclined, with respect to the central longitudinal axis X18, in a direction opposite to the inclination of the inclined intermediate portion 432. I.e., the terminal notches 434 form a return to the rear of the inner female body 22 from the inclined intermediate portion 432.

The piston 32 comprises a head 322 and a rear part 324 connected by a central part 326 provided at different longitudinal levels with guide ribs 328 that extend radially with respect to the central part 326 and make surface contact with an inner surface 296 of the ring 28 delimiting the inner duct V28 of the female element B.

The rear part 324 comprises a radial bore 324A passing through the rear part 324, wherein a cylindrical pin 330 is tightly held, which projects radially from the rear part 324 at both ends.

The guide grooves 43 are arranged around a portion of the ring 28 on which longitudinal grooves 292 are provided. Each end of the cylindrical axis 330 forms a guide pin 332 that fits into one of the guide grooves 43 and is engaged in one of the longitudinal grooves 292 of the ring 28, which secures piston 32 in rotation with ring 28.

The head of the piston 32 is solid and engages with seal 34, which is similar in type to the seal 16, with a U-shaped polymer body, for example PTFE type, and an inner metal reinforcement in the form of a stainless steel double spiral spring welded to form a closed spring. For the seal 34, the U-shape is open towards the rear of the female element B, and the legs of the U-shape have outer radial bulges at a distance from the ends of the legs of the U-shape.

The inner female body 22 has an orthoradial shaped groove 226 of rectangular cross-section, which is open on an outer radial surface 227 of the inner female body 22 and which crosses the inner female body 22 on both sides in a direction orthoradial to the axis X18. The outer female body 20 delimits the orthoradial groove 226 on the outside. The orthoradial groove 226 is extended by two holes 206 which open into part 200A of the outer female body 20.

Figure 14:
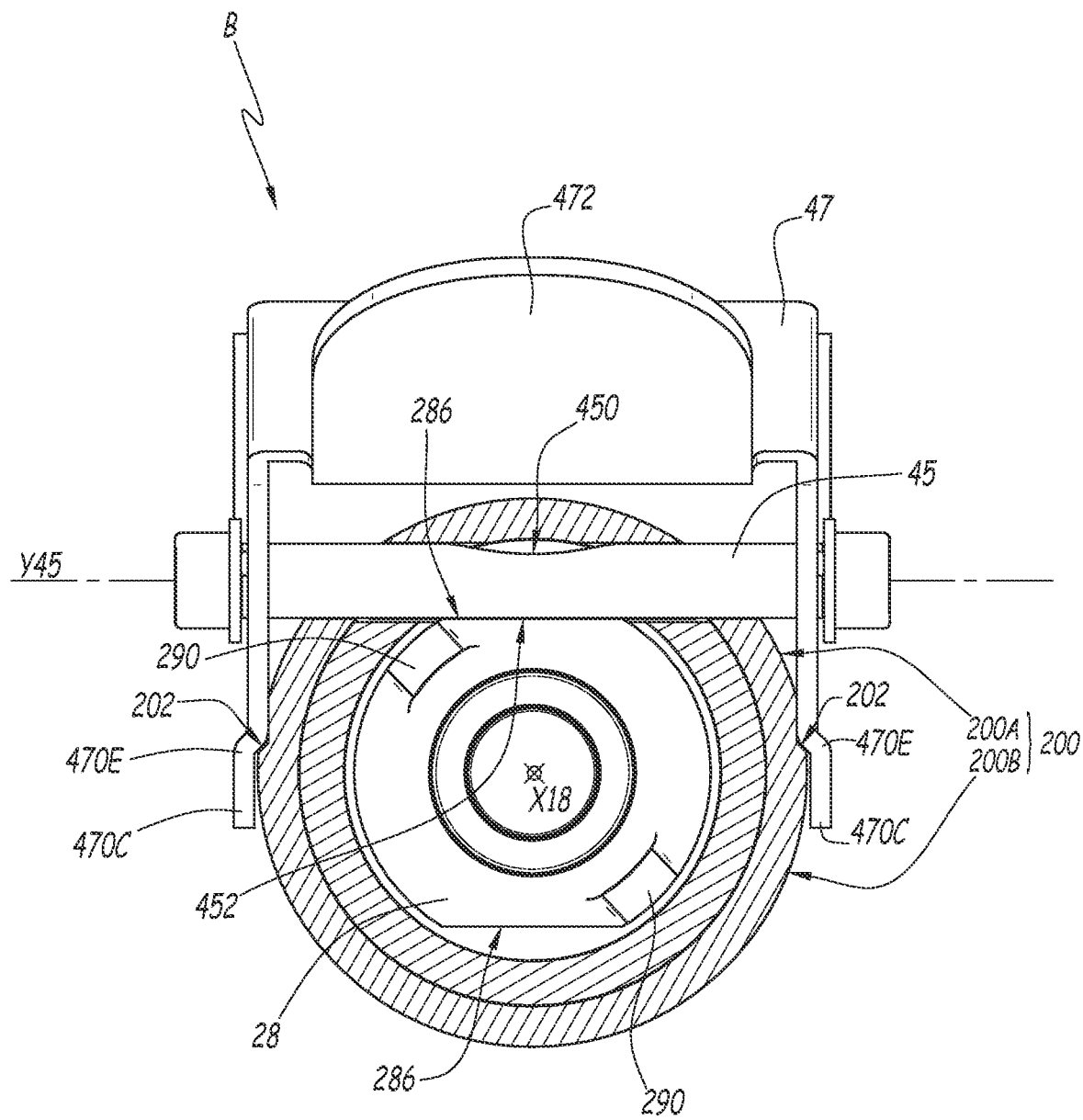
FIG. 14 is a view similar to FIG. 13, with the operating lever in the locked position and the coupling in the connected configuration.

The female element B has a rod 45 that is housed in the orthoradial groove 226 without the possibility of translation or rotation with respect to the longitudinal axis X18 in the female body 18. The rod 45 extends at the same level as the collar 284 according to the axis X18. The rod 45 passes through the female body 18 in an orthoradial direction. The rod 45 is cylindrical in shape with a circular cross-section extending along a central longitudinal axis Y45 and has a notch 450 recessed into a cylindrical outer surface 452 of the rod 45. The notch 450 is in a portion of the cylindrical surface and the diameter is substantially equal to the outer diameter of the ring 28 at the same longitudinal position, i.e., at the diameter D284 of the outer radial surface S284 of the outer collar 284. The rod 45 is rotatable around its central longitudinal axis Y45 between two positions, shown in FIGS. 13 and 14: in FIG. 13, the rod 45 is in a release position wherein the notch 450 is centered on the central longitudinal axis X18 of the female element B and faces the ring 28, so that the rod 45 is entirely outside the cylindrical volume delimited by the outer radial surface S284 around the axis X18, which corresponds to the circular base cylindrical volume of diameter D284 centered on the axis X18. The rod 45 does not interfere with the ring 18, which is therefore free to rotate with respect to the female body 18 around the axis X18 thanks to the notch 450. In FIG. 14, the rod 45 is in a locking position wherein the rod 45 engages, through the portion of the outer radial surface 452 opposite the notch 450, with one of the flats 286 of the ring 28 by line contact. The rod 45 is then partially arranged in the cylindrical volume delimited by the outer radial surface S284 around the axis X18. If the ring 28 is rotated with respect to the female body 18 in the disconnecting direction, the flat area 286 comes into contact with the outer radial surface 452 of the rod 45 and thus forms an obstacle to the rotation of the ring 28 with respect to the female body 18 around the central longitudinal axis X18. The rod 45 forms a locking device to the rotation of the ring 28 with respect to the female body 18 around the central longitudinal axis X18.

The rod 45 is rotationally fixed, around its central axis Y45, to a lever 47 forming an actuating device for the rod 45, which controls the rotation of the rod 45 between the release position and the locking position, and is mounted in a clevis around the outer female body 20. The lever 47 comprises two flanges 470, each extending on one side of the outer female body 18, and each connected to one of the ends of the rod 45 protruding from the outer female body 20. According to an example not shown, the rotational locking of the rod 45 with respect to the flanges 470 around the axis Y45 is achieved by the engagement of the two flats on the outer radial surfaces of the longitudinal ends of the rod 45 with complementary surfaces on the housings in the flanges 470 for the rod 45.

Each flange 470 comprises a central flat part 470A wherein the level ensures that it is solidly secured to the end of the rod 45. Each flange 470 comprises, a first wing 470B extending downwards, formed from the central part 470A, in FIG. 4, and a second wing 470C extending generally upwards in an oblique direction in, the same FIG. 4. The first and second wings 470B and 470C are flat and extend parallel to the central part 470A but, are offset outwardly according to the central axis Y45 so that, taken along the central axis Y45, the distance between the two central parts 470A of the two 470 flanges is less than the distance between two opposing wings 470B or 470C in a direction parallel to the central axis Y45.

The two flanges 470 are connected to a common operating part 472 of the lever 47 which extends perpendicularly in a radial direction to the longitudinal central axis X18 in connected configuration and in disconnected configuration, rotation locked.

In the disconnected configuration, each drive pin 290 is aligned with a connecting pin 36 along the longitudinal axis X18. The curved surface 290A of the drive pin 290 forms a stop for the rotation of the ring 28 with respect to the female body 18 according to the disconnection direction. The ring 28 is thus held longitudinally between the connecting pins 290 and a shoulder 228 of the inner female body 22, which ensures an axial connection between the ring 28 and the female body 18 in the disconnected configuration.

Figure 8:
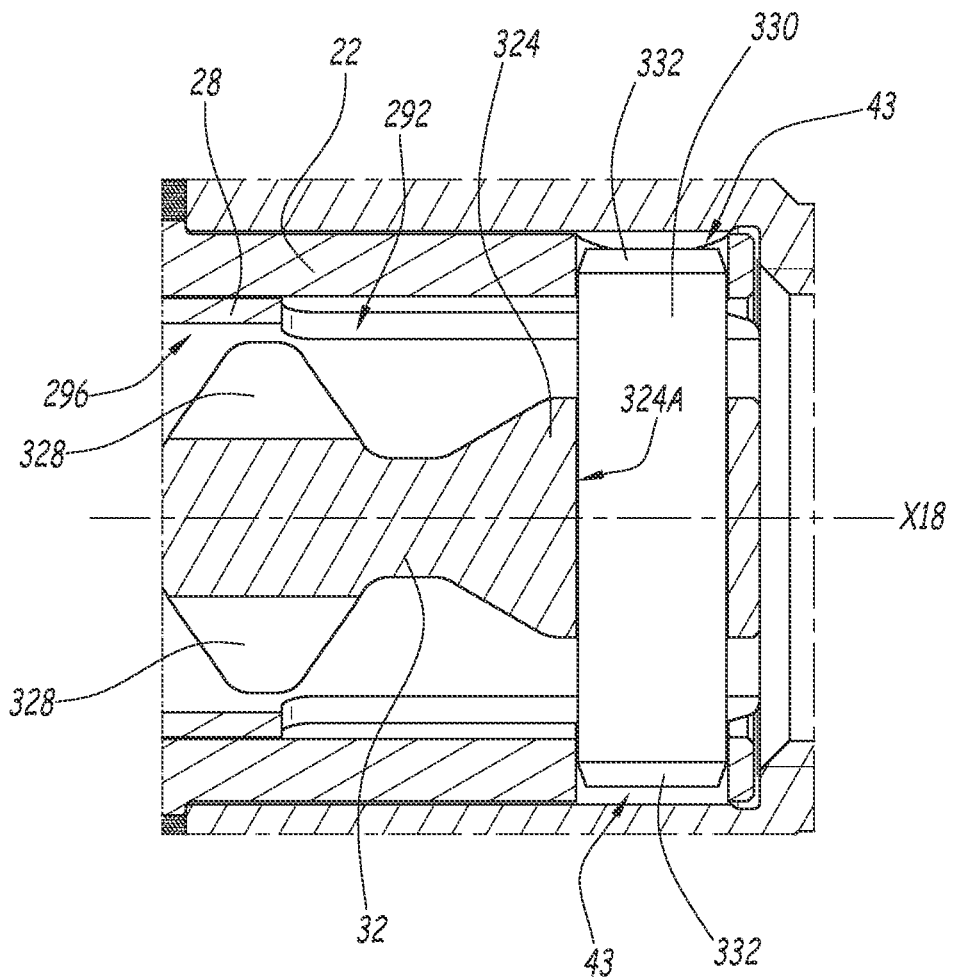
FIG. 8 is a partial section of the female element according to Plan VIII in FIG. 5.
Figure 9:
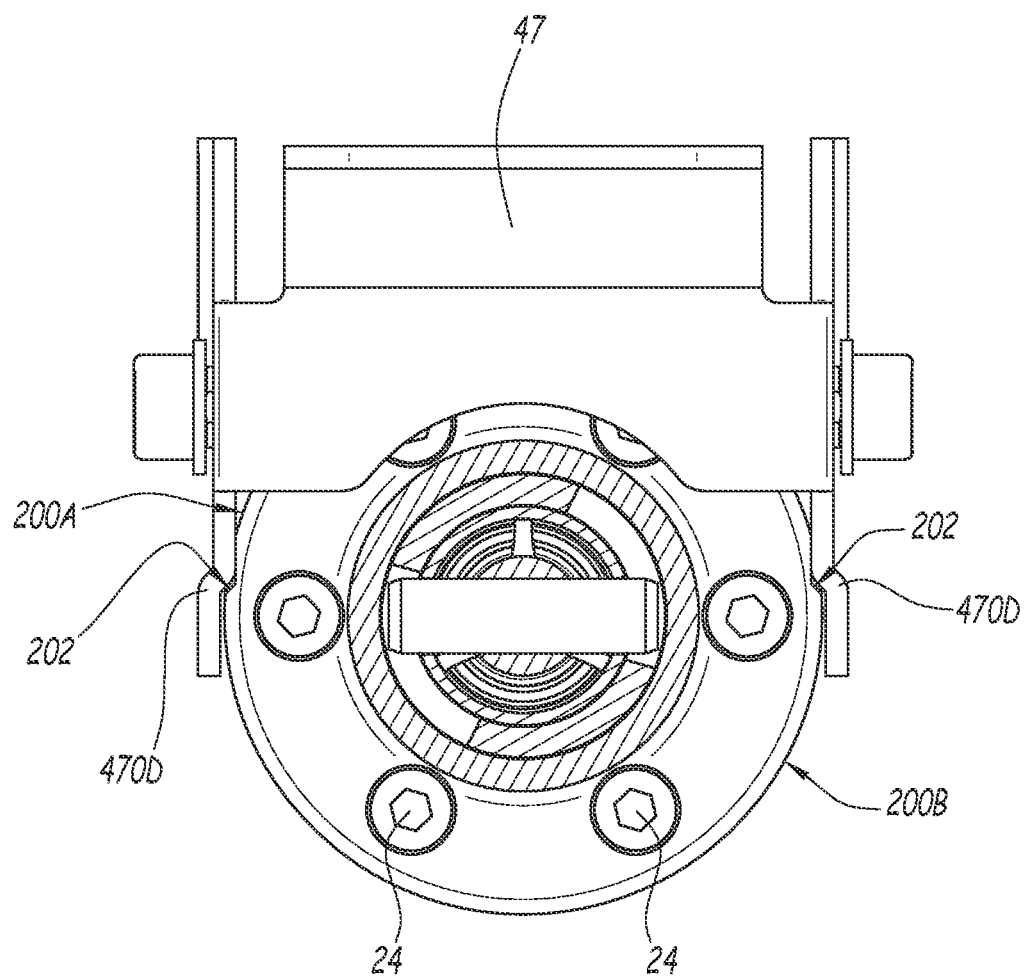
FIG. 9 is a section of the female element according to Plan IX in FIG. 5.
Figure 10:
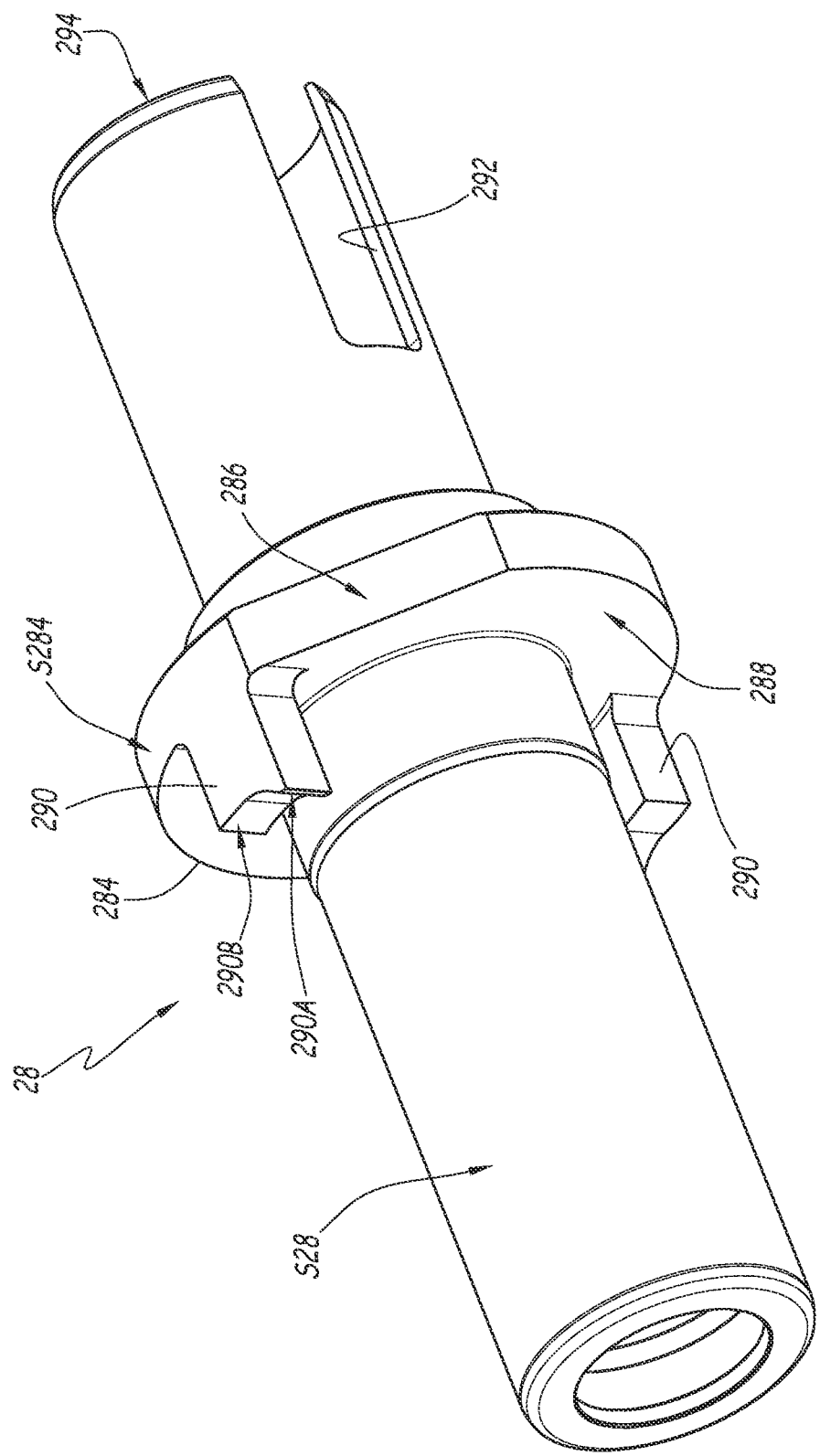
FIG. 10 is a perspective view of an inner body of the female element in FIG. 4.
Figure 11:
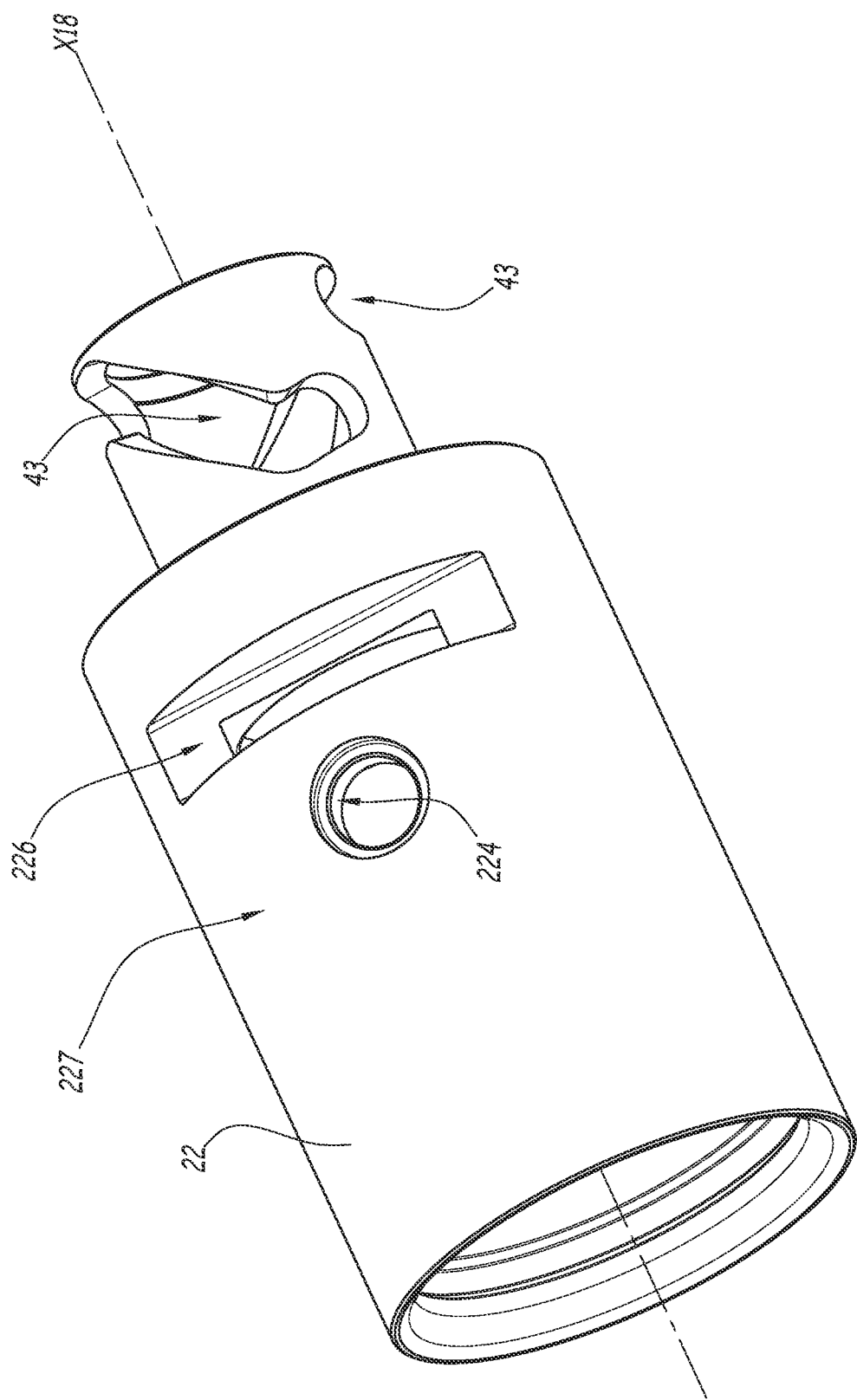
FIG. 11 is a perspective view from the front and top of an outer female body of the female element of FIG. 4.

The valve 12 and the piston 32 are in their respective closed positions (the piston 32 is in the rear position in FIG. 5, the valve 12 is in the front position in FIG. 2). The guide pins 332 of the piston 32 are engaged in the circumferential portion 430 of the guide grooves 43 and arranged behind the longitudinal grooves 292 (FIG. 8).

In the disconnected configuration, the rod 45 is in a stable position to release the rotation of the ring 28. This position is stable, because it does not require the operator to hold it against any elastic force that would by default push the rod 45 back into its locking position.

The junctions between the first wings 470B and the central parts 470A of the flanges 470 form the inner shoulders 470D which face the longitudinal shoulders 202 in the release position of the lever 47 according to a direction perpendicular to the axis Y45. Thus, any possible downward rotation of the lever 47, in a direction opposite to the rotation to the locking position, is limited. A rotation of the lever 47 to the locking position is also limited.

Figure 15:
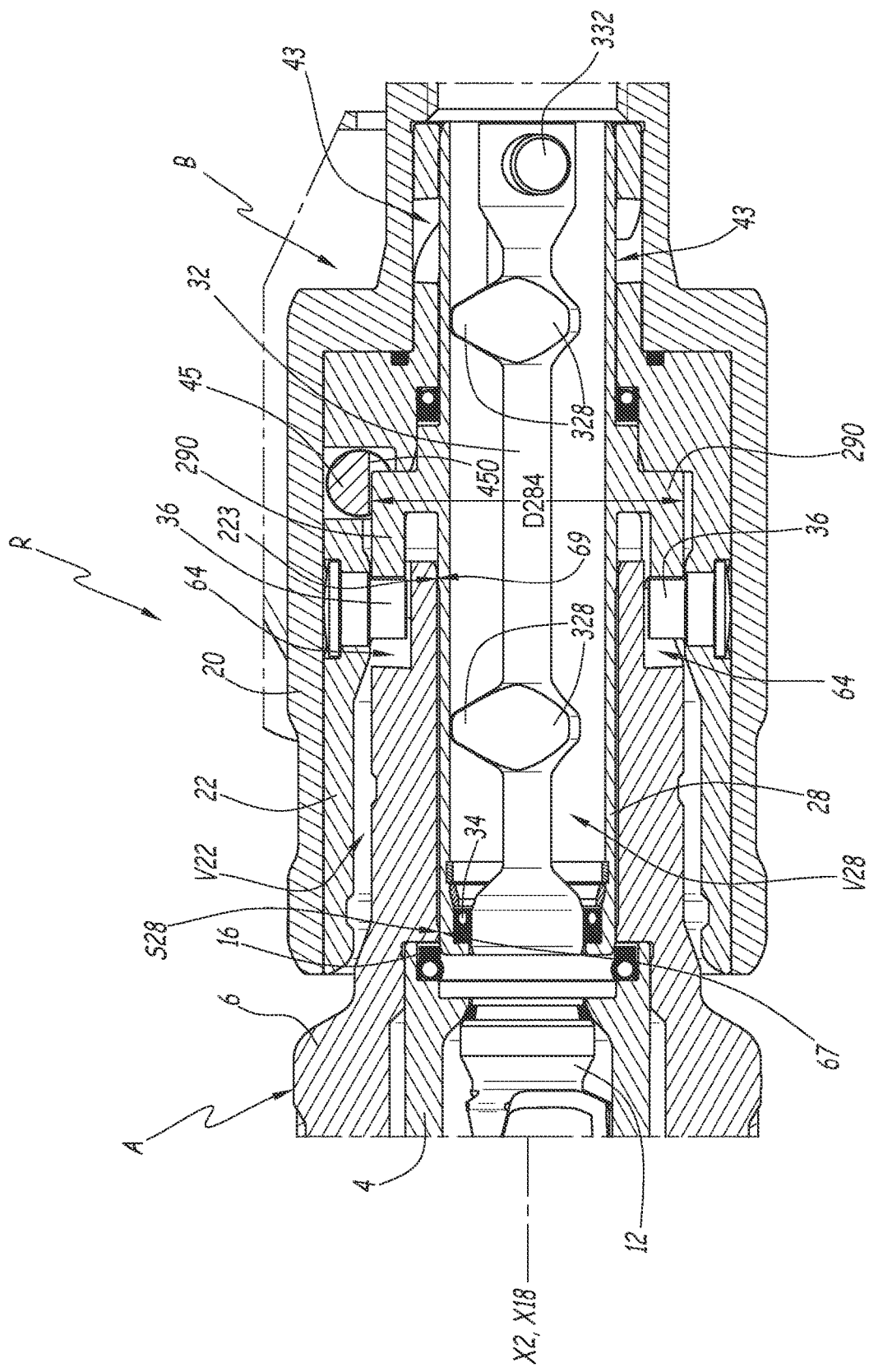
FIG. 15 is a longitudinal section of the coupling in a first connecting phase.

The connecting phase of the coupling R is described from FIG. 15 onwards for a connecting pin 36, a drive pin 290 and a guide pin 332 for simplification. At the beginning of connecting, the outer male body 6 engages in the receiving volume V22 of the female body 18, and the ring 28 engages in the inner volume V68 of the inner male body 4 at the level of the sealing ring 16. The axes X2 and X18 are then merged to form a central longitudinal axis of the coupling R and a connecting axis of the male element A and the female element B. The connecting pin 36 and the drive pin 290 are aligned longitudinally with the longitudinal entry portion 640 of the connecting groove 64. The connecting pin 36 engages in the longitudinal entry portion 640, followed by the drive pin 290. As long as the connecting pin 36 is not engaged in the inclined intermediate portion 644, the outer radial surface S28 of the ring 28 is not in contact with the seal 16 carried by the male element A.

As the insertion movement continues, each connecting pin 36 exits the inlet portion 640 and enters the inclined intermediate portion 644. The drive pin 290 is then in contact with, in the circumferential direction, one edge 640A of the inlet portion 640 of the connecting groove 64. The ring 28 and the outer male body 6 are then rotationally fixed around the central longitudinal axis X18.

Figure 16:
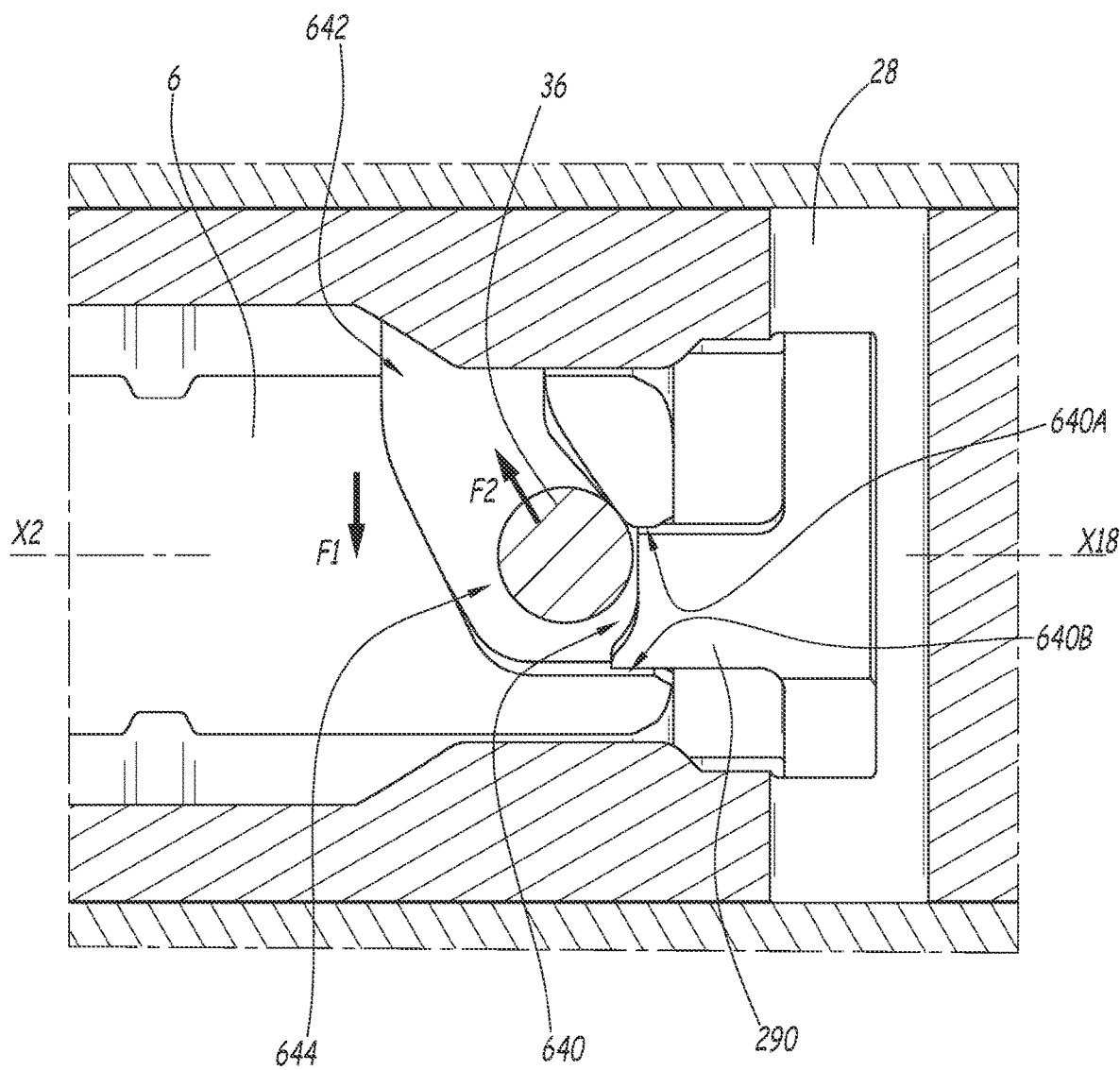
FIG. 16 is a side view partially cut longitudinally of a part of the coupling in the configuration of FIG. 15, showing a connecting groove of the male element.

The operator then applies a rotation of the outer male body 6 with respect to the inner male body 4 and with respect to the female body 18 in a connecting rotation direction F1, oriented so that the drive pin 290 moves away, with respect to the connecting pin 36, and downwards in FIG. 16, in the circumferential direction opposite to the direction wherein the curved surface 290A of the drive pin 290 is oriented (i.e., upwards in the same FIG. 16). The rotation of the outer male body 6 in the connecting direction F1 corresponds to a joint rotation of the ring 28 clockwise, when looking at the female element B from the front. The inner male body 4 is not circumferentially stopped against the ring 28 and, during connecting, thanks to the balls 8, the ring 28 and the outer male body 6 are jointly rotatable around the axis X18 with respect to the inner male body 4.

With the rotation, each connecting pin 36 progresses in its connecting groove 64 along the inclined intermediate portion 644 towards the circumferential portion 642 according to the arrow F2. The ring 28 is rotated with respect to the female body 18 according to the arrow F1. The ring 28 is therefore held axially with respect to the female body 18 between the shoulder 228 of the inner female body 22 and the front face 66 of the outer male body 6. Each guide pin 332 then advances into the circumferential portion 430, while the guide pins 332 move through the circumferential portion 430, the piston 32 remains at the same axial position with respect to ring 28, and thus remains in the closed position. Meanwhile, the connecting pins 36, engaged in the inclined intermediate portion 644 of the connecting grooves 64, drive the female body 18 with them and ensure the alignment of the male body 2 and the female body 18.

The outer male body 6 comprises two inner radial surfaces 67 and 69, which are stepped, arranged in front with respect to the seal 16 and which engage in a complementary way, when inserting the male element A, with the two outer radial surfaces S28 and 223 of the ring 28, which are stepped and both arranged in front of the outer collar 284. The inner radial surface 67 is arranged behind the inner radial surface 69 and the diameter of the inner radial surface 67 is smaller than the diameter of the inner radial surface 69. The outer radial surface S28 is located in front of the outer radial surface 223 and the diameter of the outer radial surface S28 is smaller than the diameter of the outer radial surface 223. This engagement, by engagement of the surface S28 with the surface 67 and by engagement of the surface 223 with the surface 69, forms a double guide which intervenes before the outer radial surface S28 of the ring 28 comes into sealing contact with the inner male body 4 by engaging radially with the seal 16 (FIG. 15). The radial contact of ring 28 with the seal 16 is at the level of the inner radial bulge 166, which the ring 28 will push radially outwards by deforming the reinforcement 162.

The connecting pins 36 reach the circumferential portion 642 when the sealing contact has been made between male body 2 and ring 28 at seal 16. The guide pins 332 then enter the inclined intermediate portion 432 of the guide grooves 43 (FIG. 17).

Figure 17:
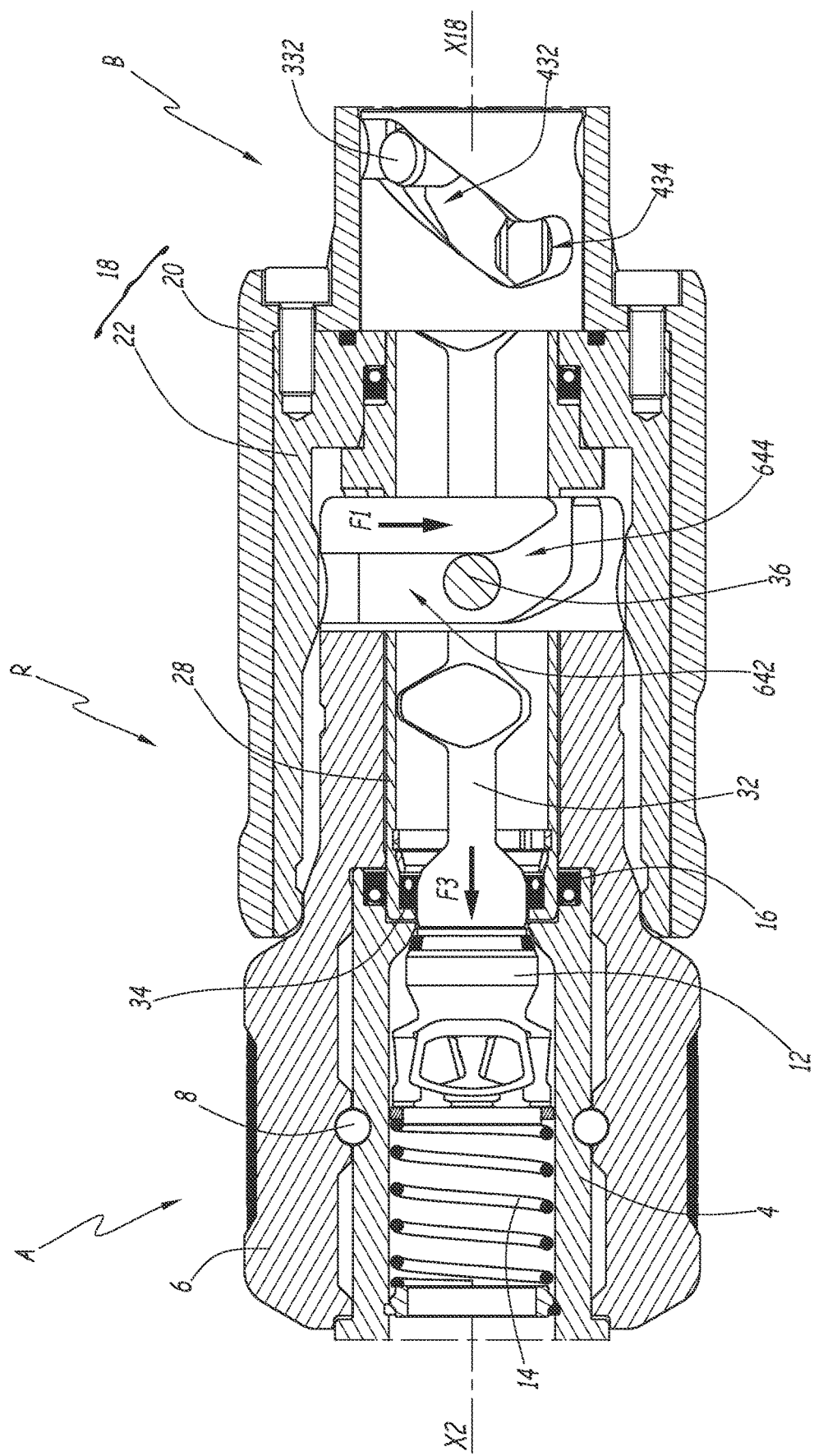
FIG. 17 is a section similar to FIG. 15, in a second connecting phase.

The angular travel of the guide pin 332 in the circumferential portion 430, i.e. the angular travel from the disconnected configuration to the inclined intermediate portion 432, corresponds to the angular travel of the connecting pin 36 to the inclined intermediate portion 644 of the connecting groove 64, and also corresponds to the longitudinal movement of the ring 28 with respect to the male body 2 from a first position, where the ring 28 does not engage in order to seal with the male body 2, visible in FIG. 15, to a second position of sealing contact of the ring 28 with the male body 2, via the seal 16, visible in FIG. 17.

When the rotation of the outer male body 6 according to the same connecting direction F1 is continued, the guide pins 332 progress in the inclined intermediate portion 432 of the guide grooves 43, which creates a forward movement of piston 32 with respect to ring 28, according to the arrow F3. The assembly formed by the ring 28 and the piston 32 rotates around the central longitudinal axis X18 with respect to the female body 18. In this forward movement of the piston 32, the solid head 322 leaves the sealing contact with the ring 28 and pushes the valve 12 to its open position towards the rear of the male element A, against the force of the spring 14. The connecting pins 36, engaged in the circumferential portion 642 of the connecting groove 64, prevent the longitudinal disengagement of the male body 2 and the female body 18. The ring 28 is held longitudinally in the female body 18 with the collar 284 engaged between the front face 66 of the male body 2 and the shoulder 228 of the inner female body 22, which ensures axial securement between the ring 28 and the female body 18 in the connected configuration. The guide pins 332 reach a high point of the guide grooves 43, located at the intersection of the inclined intermediate portion 432 and the terminal notch 434.

Figure 21:
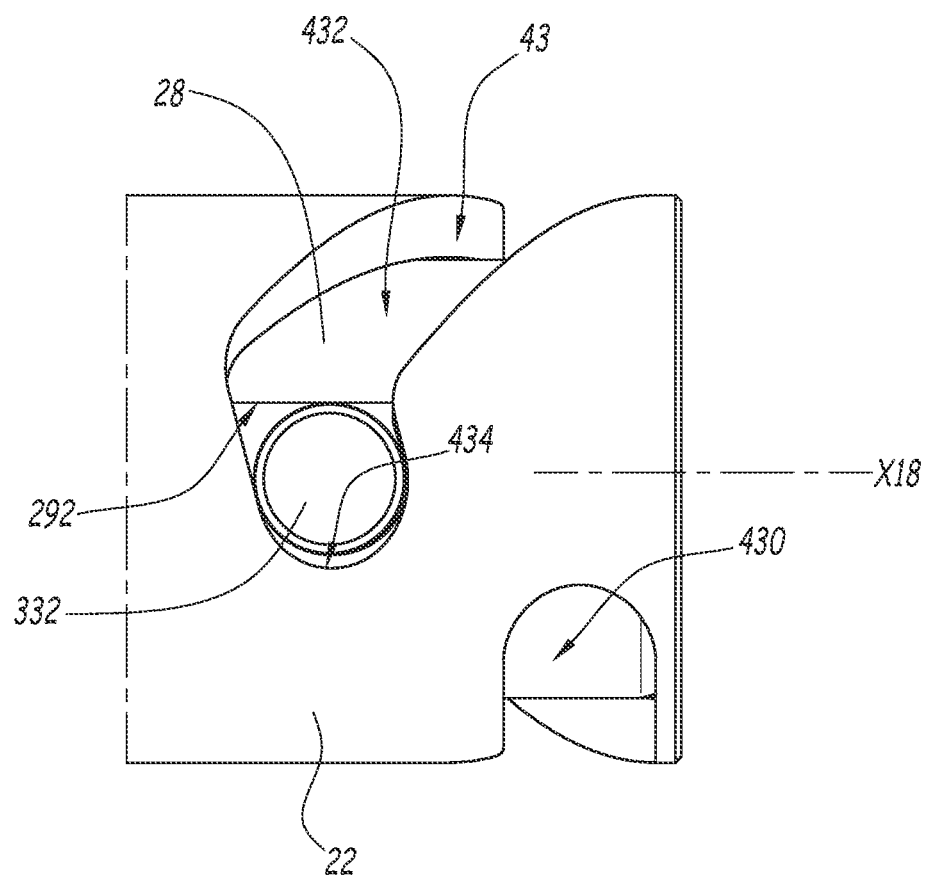
FIG. 21 is a side view of the guide groove in the configuration of FIG. 20.
Figure 22:
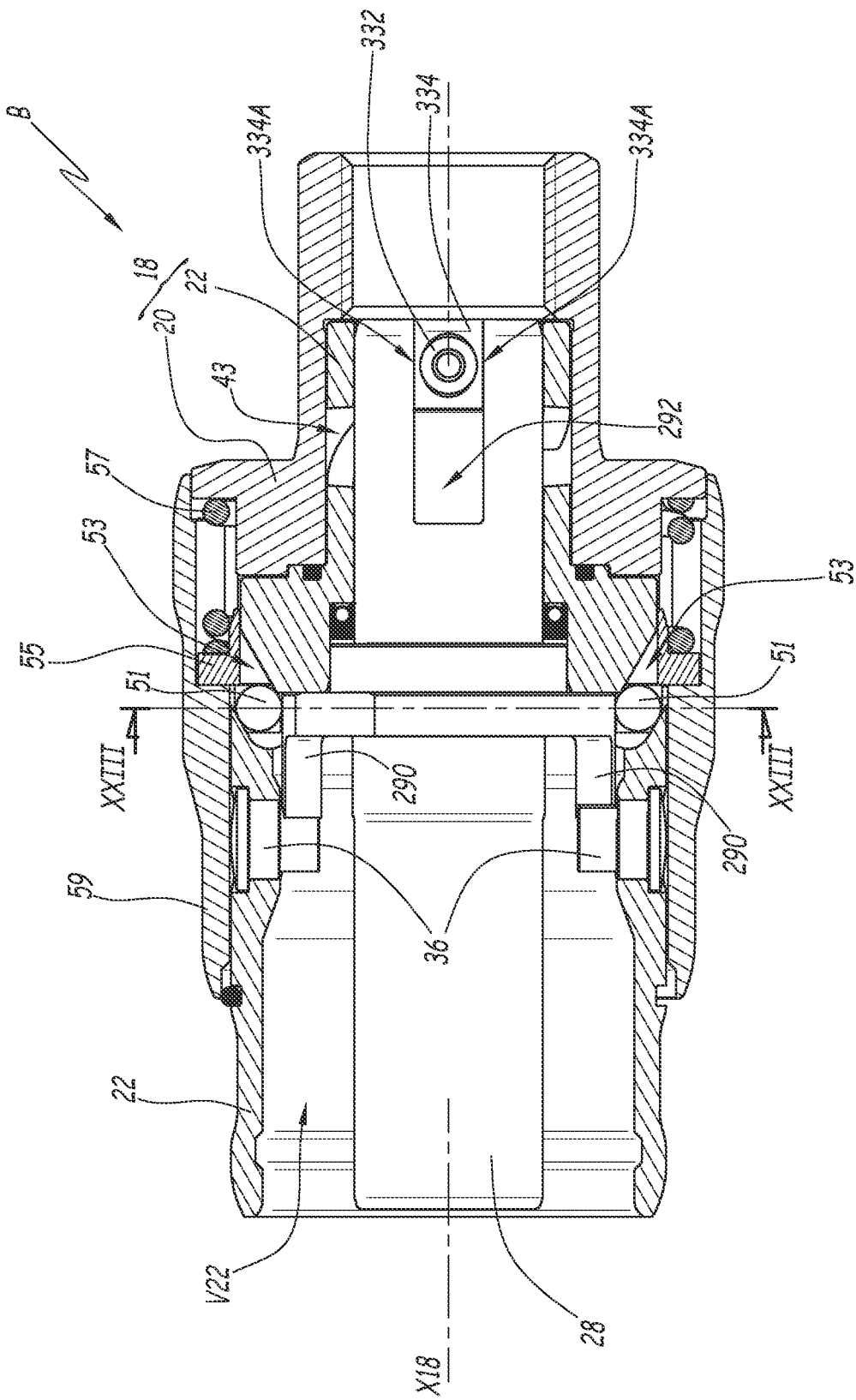
FIG. 22 is a cross section of a female element of a coupling according to a second embodiment of the invention in the disconnected configuration.
Figure 23:
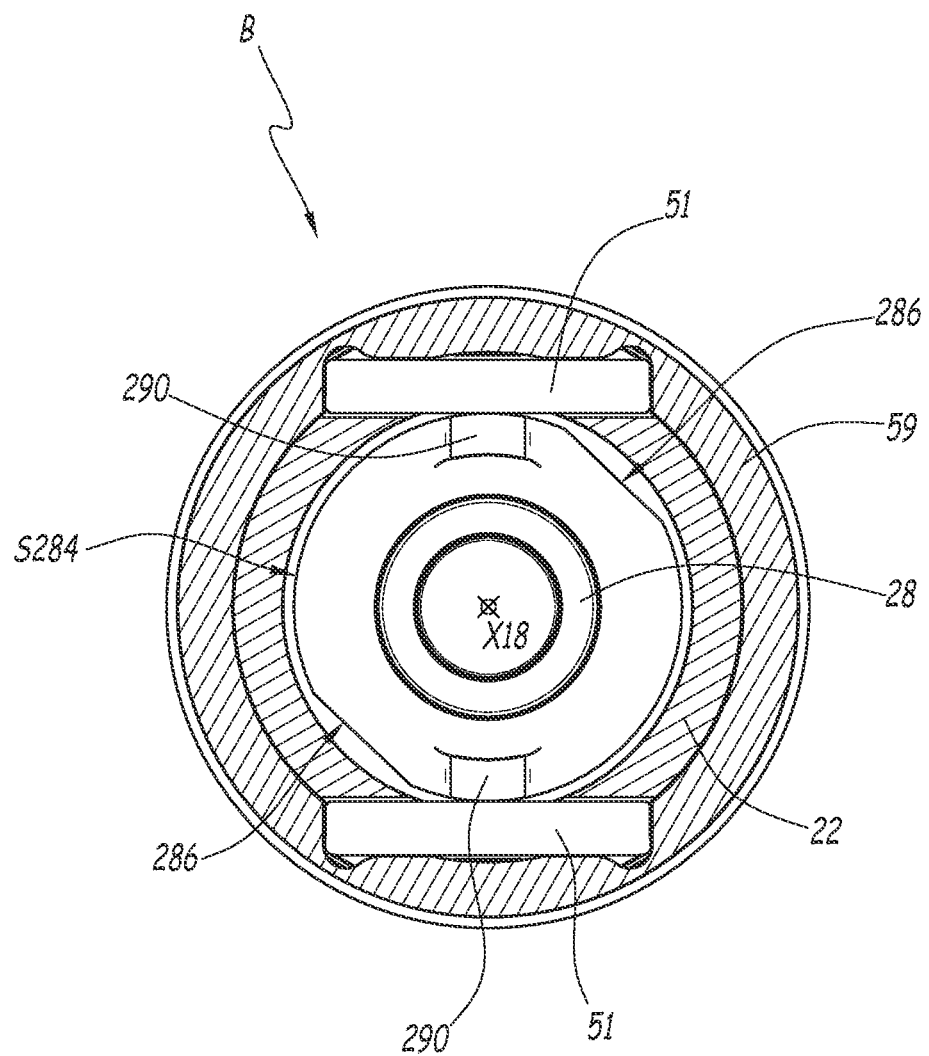
FIG. 23 is a cross section of the female element of FIG. 22 according to Plan XXIII.
Figure 24:
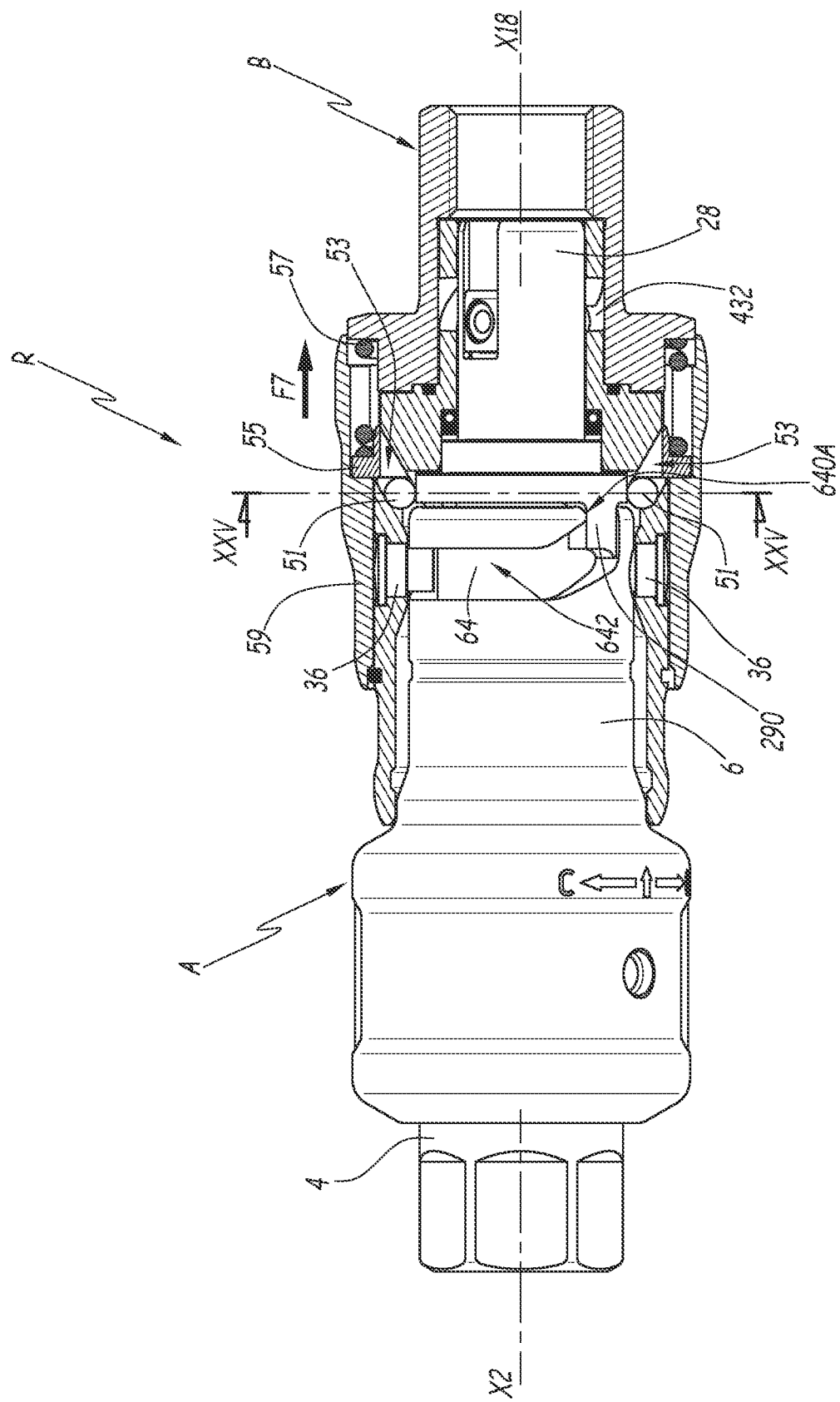
FIG. 24 is a side view of the male element of FIG. 2 connected to the female element of FIG. 22 seen in longitudinal section in connected configuration of the coupling, rotation locked.
Figure 25:
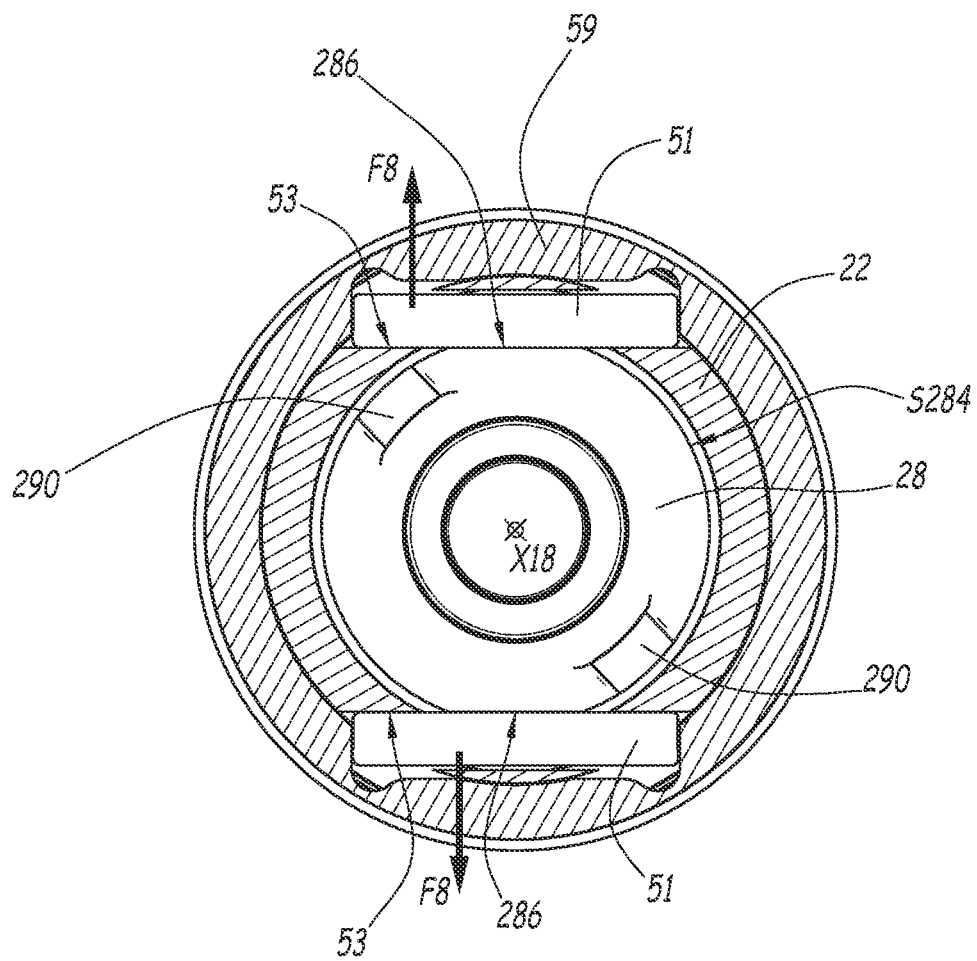
FIG. 25 is a section according to Plan XXV in FIG. 24, with the coupling in connected configuration and rotation locked.

As rotation continues, the guide pins 332 engage in the terminal notches 434, with a slight backward movement of the piston 32 according to the arrow F4 with respect to the female body 18 and the ring 28, this movement resulting from the force exerted by the spring 14 of the valve 12 on the piston 32 and the backward inclination of the terminal notch 434 (FIG. 21). I.e., the movement of the piston 32 between its closed position, in the disconnected configuration of the coupling, and its open position, in the connected configuration of the coupling, has a longitudinal overtravel, beyond the forward open position of the female element B. The guide pins 332 come to a stop with the blind end of the terminal notches 434. This overtravel corresponds to the distance, according to the longitudinal direction between the upper point of the guide groove 43 and the stop formed by the blind end of the terminal notch 434.

The connected configuration is then reached. The piston 32 and the valve 12 are in the open position (forward position for the piston 32, backward position for the valve 12). The inner ducts V28 and 42 are in fluid communication and the seal 16, radially interposed between the ring 28 and outer male body 6, ensures the seal between the male element A and the female element B. Between the disconnected configuration and the connected configuration, the ring 28 has been rotated about 135° around the longitudinal axis X18. Between the disconnected configuration and the connected configuration, the outer male body 6 has travelled an angular stroke identical to the rotation of ring 28 around the X18 axis. In the connected configuration, thanks to the balls 8, the ring 28 and the outer male body 6 are jointly movable in rotation around the X18 axis with respect to the inner male body 4.

During the entire connecting phase from the disconnected configuration to the connected configuration, the rod 45 remained in the release position. The coupling R is then in a connected configuration but with the rotation of the ring 28 not locked, which means that a rotation of the outer male body 6 with respect to the female body 18 in the disconnecting direction is possible.

Figure 19:
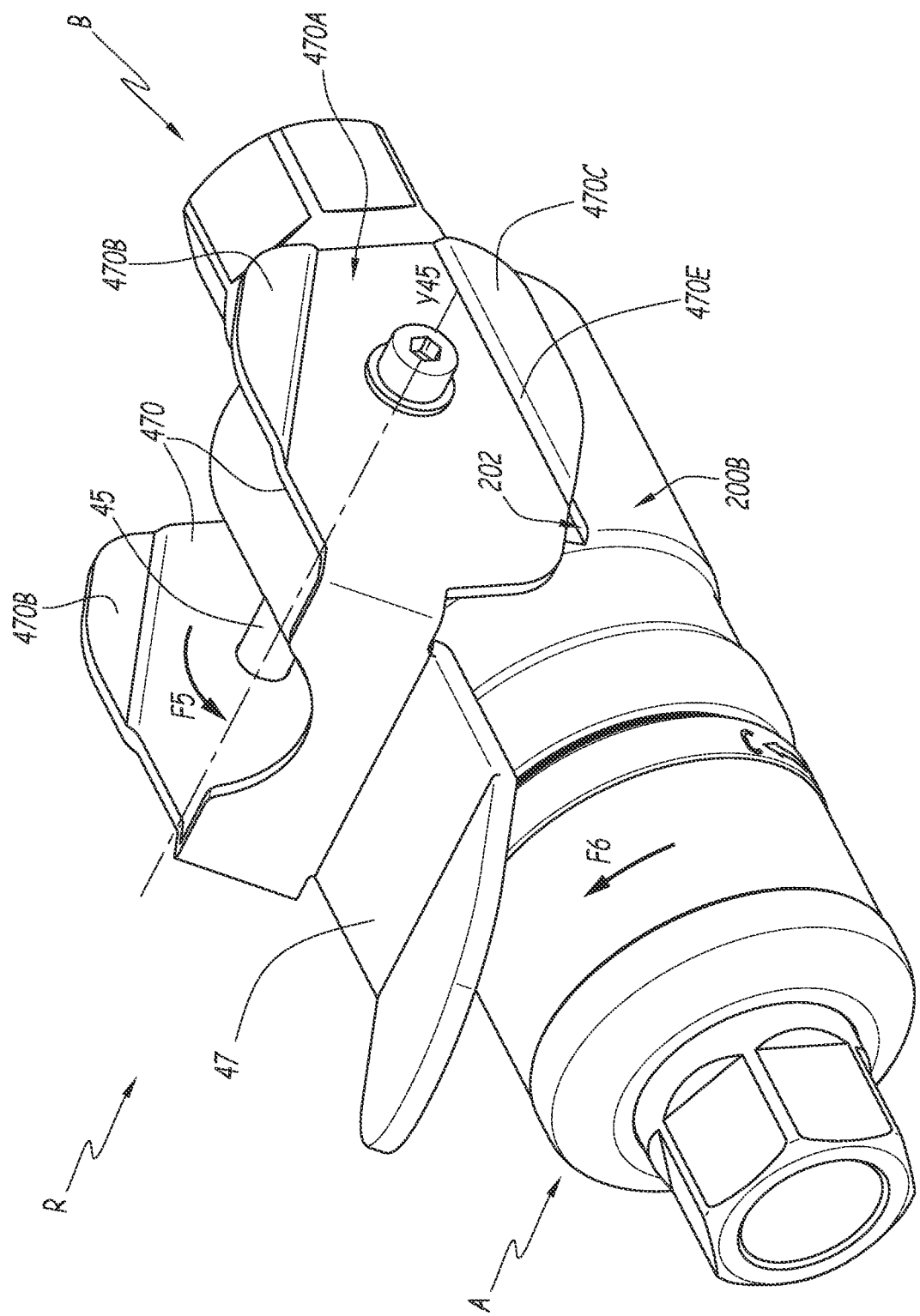
FIG. 19 is a perspective view of the coupling in a connected and rotation-locked configuration.

The flats 286 of the ring 28 are then parallel to the axis Y45 of the rod 45. The lever 47 can then be rotated by the operator around the axis Y45, over a stroke of about 150° according to the arrow F5 to its locking position (FIG. 19) to bring the outer radial surface 452 of the rod 45, opposite the notch 450, opposite the flat 286 facing the rod 45, into the configuration shown in FIG. 14.

Figure 20:
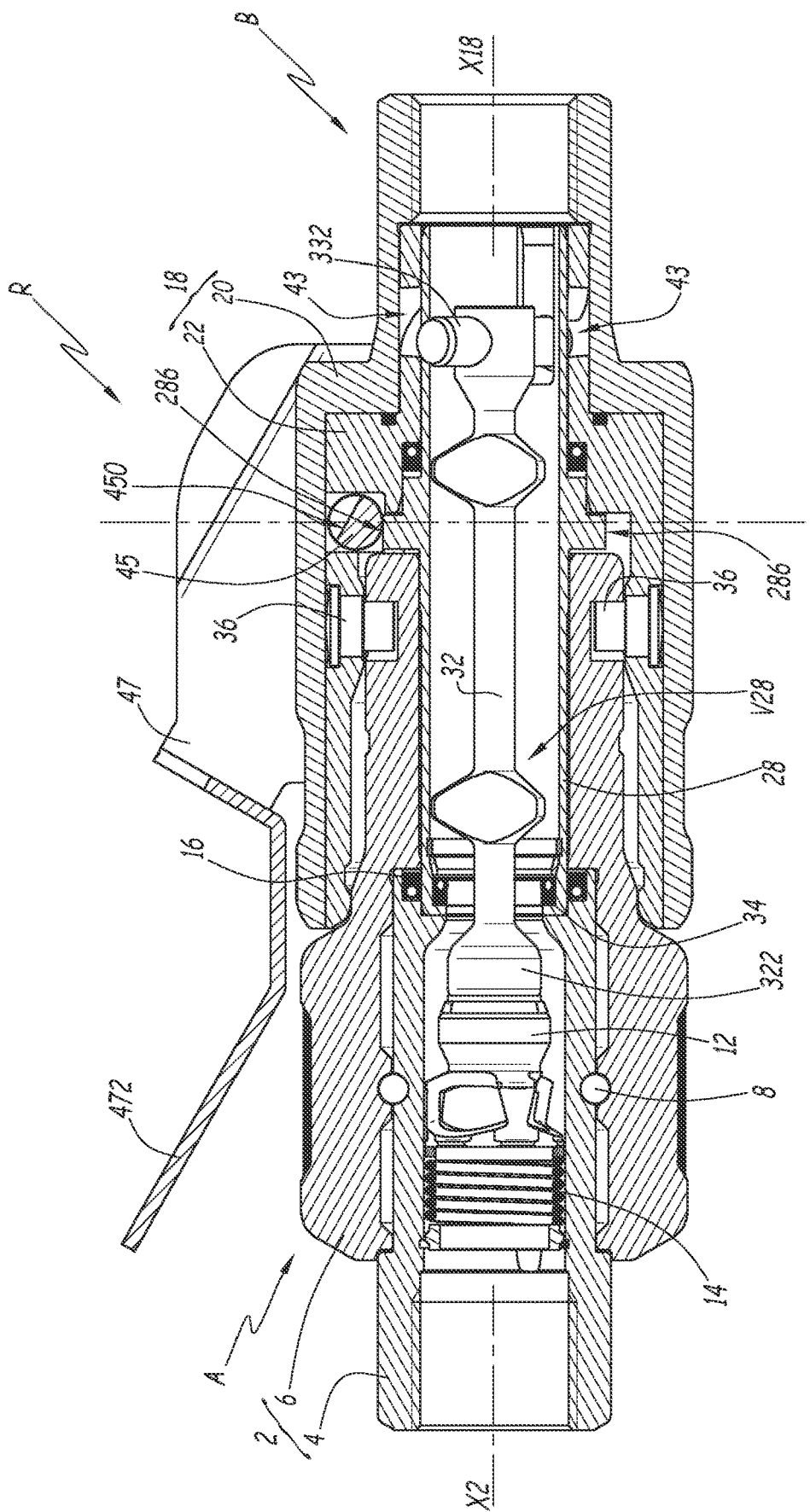
FIG. 20 is a longitudinal section of the coupling in the connected and rotation-locked configuration.

In this rotation between the release position and the locking position, the central parts 470A of the flanges 470 are brought to the level of part 200B, elastically moving away from each other, which slows down the movement of lever 47 towards its locking position, and then tightening again when the second wings 470C have taken position around part 200B. In this position, the junction between the second wings 470C and the central portions 470A, forming the inner shoulders 470E, are brought to the low position in FIG. 19, facing the longitudinal shoulders 202 according to a direction perpendicular to the axis Y45. The engagement of the inner shoulders 470E with the longitudinal shoulders 202 limits the possibility of rotation of the lever 47 beyond its locking position. A connected configuration with locked rotation of the ring 28 is then obtained (FIG. 20). The movement of lever 47 to its release position is slowed by the engagement of the longitudinal shoulders 202 and the inner shoulders 470E since the center parts 470A are tightened with respect to the longitudinal shoulders 202 have to move apart to allow this rotation.

In order to disconnect the coupling R, the operator must first rotate the lever 47 around axis Y45 to the release position, in the opposite direction to the arrow F5. The notch 450 then faces the flat 286. The operator can once again turn the ring 28 by rotating the outer male body 6 with respect to the female body 18 in a disconnecting direction F6 opposite to the connecting direction F1. In this rotation, one edge 640B of the longitudinal inlet portion 640, opposite the edge 640A, engages circumferentially with the ring 28 by coming into contact with the outer male body 6 in the disconnecting direction F6. The disconnecting direction F6 corresponds to a counterclockwise rotation of the ring 28 when looking at the female element B from the front.

The guide pins 332 then engage in the inclined intermediate portion 432 of the guide grooves 43 after an overtravel of the piston 32 forwards, while the connecting pin 36 moves in the circumferential portion 642 of the connecting groove 64 in the direction of the longitudinal entry portion 640. The piston 32 moves backwards with respect to the ring 28. The valve 12 follows the movement of the piston 32, which is pushed by its spring 14 towards the front of the male element A. When the connecting pins 36 are aligned with the longitudinal inlet portions 640 of the connecting groove 64, the connecting pins 36 come to a stop against the curved surfaces 290A of the drive pins, which limits the movement of the piston 32 with respect to the ring 28 when the piston 32 returns to the retracted closed position. The valve 12 returns to its closed position. The connecting pins 36 and the drive pins 290 can be disengaged from the connecting groove 64 and the two elements of the coupling R are then disengaged from each other. The two parts of the coupling R are then in the disconnected configuration.

The invention provides the following advantages:

The kinematics comprising the piston 32 with the guide pins 332 mounted in a longitudinal groove 292 of the rotating ring 28 and in the guide grooves 43 of the inner female body 22 is particularly suitable for cryogenic applications wherein ice can form between the parts (and must be broken by relative rotation of the constituent parts of the coupling) and/or applications wherein the seals used are more difficult to deform than conventional O-ring elastomer seals.

The free rotation of the outer male body 6 with respect to the inner male body 4 prevents torsional stress on the pipes when connecting or in the connected configuration of the fluid coupling R.

The locking device formed by the rod 45 secures the connected configuration against unintentional disconnection. Since the rotation between the ring 28 and the female body 18 is blocked by the locking device, the free rotation of the outer male body 6 with respect to the inner male body 4, allowed by the ball crown 8, prevents the torsion between the pipes connected to the male element A and the female element B from stressing the locking device. These torsions are absorbed by the free rotation between the inner male body 4 and the outer male body 6 during connecting and in the connected configuration.

The implementation of the integrated freedom of rotation on the male element A, in contrast to the integrated freedom of rotation on the female element B, simplifies the connecting sequence. Indeed, for a female element B integrating a freedom of rotation between an inner body and an outer body, there would be a risk of unintentionally opening piston 32 when no male element A is fitted in female element B, which would require additional locking systems to be released in the disconnected configuration prior to connecting.

The fact that the connecting pins 36 and the drive pins 290 are recessed from the front face 282 of ring 28 limits any risk of unintentional action on these pins outside the connecting sequence.

Thanks to the inclined intermediate portion 644 of the connecting groove 64 related to the circumferential portion 430 of the guide groove 43, the first phase of rotation of the ring 28 during connecting serves to create a radial seal between the ring 28 and the male body 2 at a level of the seal 16, prior to any axial movement of the piston 32 with respect to the ring 28. The reduction obtained by the contact between the connecting pin 36 and the inclined intermediate portion 644 allows it to advantageously deform the U-shaped seal 16 with reinforcement, which is more difficult to deform than a conventional O-ring.

The orthoradial locking device formed by the rod 45 limits the radial dimensions of the female element B. As the rod 45 passes through the female body 18 and is guided in the female body 18, the rod 45 offers an extended and symmetrical locking with the flat 286 of the ring 28. The locking device then effectively resists unintentional unlocking forces. Only one of the two flats 286 of the ring 28 is functional for locking the ring 28, the other flat 286 allows the ring to be mounted in the female body 18 in one or other of two opposite positions at 180° around the longitudinal axis X18.

The operation of the rod 45 is facilitated by the operating device (either lever 47 or an operating sleeve described below). In particular, the rotation of the lever 47 between the locking position and the release position makes these positions easily identifiable by the operator.

The lever 47 in the locking position partially overlaps the outer male body 6 in the connected configuration, which limits access to the outer male body 6 for the release rotation as long as the rotation lock of ring 28 is not lifted. In the position for releasing the rotation of ring 28, the lever 47 extends only behind the front face 180 of the female body 18, which allows the operation of outer male body 6.

The longitudinal grooves 292 opening on the rear of the ring 28 facilitate assembly. The longitudinal grooves 292 do not participate in the longitudinal stop of the movement of the piston 32 towards its rear closed position with respect to the ring 28: it is a circumferential stop formed by the curved surface 290A between the drive pin 290 and the connecting pin 36 that ensures this closed position. The piston 32 in the closed position is therefore held axially in the ring 28 without, however, being free of axial play with the ring 28, which allows a slight adaptation of the longitudinal position of the piston 38 with the seal 34 carried by the ring 28.

The overtravel provided by the guide groove 43 between its high point and the terminal notch 434 contributes to maintaining the coupling R in the connected configuration and limits the forces on the locking device in the locked position.

The seal 16 with U-shaped elastomer body and reinforcement is more resistant to low temperatures than a conventional elastomer O-ring. In addition, this type of seal, whose contact is made at the outer bulges of the legs, bulges located at a distance from the ends of the legs, is more rigid than a lip seal whose lip end is in contact with the opposite part and is solicited by the successive insertion and removal movements of the opposite part. Preferably, this type of seal with a U-shaped elastomer body and reinforcement is used for all seals between two parts moving with respect to the quick connecting, such as the seals 16, 30 and 34.

Preferably, the U-shape of the seal 34 is open in the longitudinal direction of movement of the piston 32 from its open position to its closed position.

A second embodiment of the invention is shown in FIGS. 22 to 25. In this embodiment, the elements common to the first embodiment bear the same references and function in the same way. In particular, the male element A is identical to the first embodiment and in disconnected configuration, during connecting and in the connected configuration, the inner male body 4 and outer male body 6 are free to rotate with respect to each other around the longitudinal axis X2 but are devoid of relative mobility in translation along the axis X2.

In this embodiment, the rotation locking device of the ring 28 is formed by two orthoradial rods 51, each mounted with the possibility of displacement in an orthoradial groove 53 of the inner female body 22. The two rods 51 are parallel and the two grooves 53 are symmetrical with respect to the axis X18. The grooves 53 are inclined and converge towards the front of the female element B. They open into an inner volume of the inner female body 22 at the outer collar 284 level of the ring 28. In the disconnected configuration, the two rods 51 are pushed forward by a front axial surface of an annular washer 55 which is pushed back by a spring 57. The washer 55 rests at the front against an operating sleeve 59 mounted around the female body 18 and against the rods 51. The sleeve 59 forms the operating element for the rods 51. The sleeve 59 controls the movement of the rods 51 from the locking position to the release position to the extent that it allows the movement of the rods 51 from the locking position to the release position. The operating sleeve 59 is held axially on the female body 18 by a stop integral with the inner female body 22.

In this embodiment, each guide pin 332 comprises a shoe 334 with two parallel surfaces 334A which engage with the two longitudinal surfaces of a longitudinal groove 292 for the sliding of the piston 32 with respect to the ring 28.

As in the first embodiment, during connecting, the drive pin 290 comes into circumferential engagement with the edge 640A of the inner male body 6, thus fixing the ring 28 to the outer male body 6 in rotation around the axis X18; the connecting pins 36 engage into the circumferential portions 642 of the connecting grooves 64; the opening of the piston 32 occurs by moving the guide pins 332 into the guide grooves 43 with an inclined portion.

In the disconnected configuration (FIGS. 22 and 23), the two rods 51 are held in contact with the outer radial surface S284 of the ring 28 and are thus entirely arranged outside the cylindrical volume delimited by the outer radial surface S284 around the axis X18. The rods 51 do not therefore prevent the rotation of the ring 28, and are therefore in the release position, even if the operator does not act on the operating sleeve 59. The release position of the rods 51 in the disconnected configuration is therefore a stable position. When, in the connecting sequence, due to the rotation of the ring 28, the flats 286 reach a position parallel to the rods 51 in the connected configuration, the rods 51 are pushed back towards the ring 28, in the direction of axis X18, and held against the flats 286 by the washer 55 and the spring 57. The movement of the rods 51 from the release position to the locked position in the connected configuration is therefore automatic. By engaging with the flats 286, the rods 51 are then in the locked position (FIGS. 24 and 25) wherein they come into contact with the flats 286. Each rod 51 then extends partially into the cylindrical volume delimited by the outer radial surface S284 around the axis X18 and forms an obstacle to the rotation of the ring 28 if the latter is rotated with respect to the female body 18 in the disconnected direction. In the locked position, the pins 51 are held solidly to the female body 18 around the longitudinal axis X18 and prevent the rotation of the ring 28 in the disconnecting direction. The release and locking positions of each pin 51 are parallel.

To control the movement of the rods 51 from their locking position to their release position, the operator pushes the operating sleeve 59 towards the back of the female element B, according to the arrow F7, against the force of the spring 57, which drives the washer 55 backwards and releases the rods 51 from any force of the spring. The rods 51 are then free to move outwards in the grooves 53. When the ring 28 is rotated in the disconnecting direction, while the operating sleeve 59 is held back, the rods 51 are pushed by the outer radial surface S284 of ring 28 into the grooves 53 in the release position according to the arrows F8. In this embodiment, the two flats 286 of the ring 28 are functional.

According to a variant not shown, the pins 45 or rods 51 extend along a central axis which is transversal but not orthoradial to the central longitudinal axis X18.

According to another variant not shown, the seal 16, which establishes the seal between the male body 2 and the female body 18, can be housed in an outer peripheral groove of the ring 28. The U-shape of the seal 16 is then open towards the rear of female element B.

According to another variant not shown, the seal 34, which creates a seal between the piston 32 and the ring 28, can be housed in an outer peripheral groove of the piston 32.

According to another variant not shown, the drive pins can be provided on the front of the outer male body 6, whereas the drive notches can be provided on the ring 28 for the circumferential engagement between the outer male body 6 and the ring 28.

According to another variant not shown, the male element A may not comprise a valve 12.

According to another variant not shown, the open position of the piston 32 may be a retracted position and the closed position of the piston 32 may be an advanced position. The inclined portion of the guide groove 43 is then oriented in such a way that, during connecting, the piston 32 moves towards the back of the female element B.

According to another variant not shown, the male element A can have a single connecting groove 64, and female element B can have a single connecting pin 36 and a single drive pin 290. Also, the female element B may have a single guide pin 332 and a single guide groove 43.

According to another variant not shown, for more precise rotational guidance of the inner male body 4 and the outer male body 6, the male element A may comprise two crowns of balls 8 interposed between the outer male body and the inner male body, or more than two crowns of balls 8, these crowns being offset from each other along the longitudinal axis X2.

According to another variant not shown, the female element B may comprise a longitudinal fixing element of the ring 28 in the female body 18 which allows the relative rotation of ring 28 and the female body 18 around the axis X18. This fixing element can be a pin fixed in the female body, projecting radially inwards from the female body, and engaged in an outer circumferential groove of the ring.

According to another variant not shown, the pin 45 with the notch 450 is movable, with respect to the female body 18, between the locked position and the release position, around an axis that is inclined with respect to the longitudinal direction and is not an orthoradial axis. For example, this axis of rotation is radial to the central longitudinal axis and perpendicular to a flat 286 of ring 28 in the connected configuration. The notch is then recessed from an outer end surface of the rod. In the locked position, the outer end surface of the rod is arranged in the cylindrical volume delimited by the outer radial cylindrical surface S284 of the ring and engages with the flat 286 of the ring 28 to lock the rotation of the ring 28 with respect to the female body in the disconnecting direction. As the rod rotates between the locked and release positions, the outer end surface of the rod is longitudinally offset from the flat 286, while the notch in the outer end surface of the rod is brought into contact with respect to the outer radial surface S284 of the ring 28 and does not interfere with the rotation of the ring in the disconnecting and connecting direction.

For all embodiments, in the release position, the locking device is arranged outside the volume occupied by the ring 28 in the connected configuration to the disconnected configuration, as well as in the disconnected configuration to the connected configuration. Thus, in the release position, the locking device does not interfere with the angular displacement of the ring 28 with respect to the female body in the disconnecting and connecting directions. In the disconnected configuration, the locking device does not prevent the rotation of the ring 28 with respect to the female body 18 around the central longitudinal axis X18 in the connecting direction.

The features of the embodiments and variants described above can be combined to form new embodiments within the scope of the claims.

The invention claimed is:

1. A fluid coupling comprising a male element and a female element capable of being fitted together according to a central longitudinal axis of the coupling, the male element having a male body forming at least one connecting groove, said connecting groove comprising a longitudinal inlet portion which opens on a front face of the male element, and a circumferential portion, the female element comprising:

a female body forming a receiving volume of the male body, and comprising at least one connecting pin extending into the receiving volume, and able to engage with the circumferential portion of the connecting groove in a connected configuration of the coupling, the female body also comprising at least one guide groove comprising an inclined portion with respect to a circumferential direction and with respect to a longitudinal direction, a piston comprising at least one guide pin radially projecting from the piston, the guide pin being engaged in the guide groove, a ring radially interposed between the piston and the female body and delimiting an inner channel of the female element, the piston being prevented from rotating with respect to the ring but mounted so as to be longitudinally slidable with respect to the ring between a position closing the inner channel, wherein the piston and the ring engage in a sealed manner, and a position opening the inner channel, wherein the coupling comprises a seal radially interposed between the ring and the male body in the connected configuration of the coupling, wherein, between a disconnected configuration of the coupling and the connected configuration, the ring is rotated with respect to the female body around the longitudinal axis of the coupling in a connecting direction and the ring is held longitudinally in the female body, and the piston is moved longitudinally from its closed position to its open position, wherein the male body comprises an outer male body and an inner male body, the inner male body delimiting an inner duct of the male element, the outer male body carrying the connecting groove, wherein, during connecting, the outer male body and the ring are rotationally fixed around the central longitudinal axis, wherein, in the connected configuration, the outer male body and the ring are rotationally fixed around the central longitudinal axis, wherein, during connecting and in the connected configuration, the outer male body and the inner male body are free to rotate with respect to each other around the longitudinal axis but are not movable in translation with respect to each other along the longitudinal axis, wherein the female element comprises at least one locking device movable in the female body, in the connected configuration of the coupling, between a locking position, wherein the locking device prevents rotation of the ring with respect to the female body around the longitudinal axis in a disconnecting direction, and a release position, wherein the locking device does not prevent rotation of the ring in the disconnecting direction, and wherein in the disconnected configuration, the locking device does not prevent the rotation of the ring in the connecting direction.

2. The coupling according to claim 1, wherein the connecting groove comprises an intermediate portion inclined in a circumferential direction and a longitudinal direction, located between the circumferential portion and the longitudinal entry portion of the connecting groove, wherein the guide groove comprises a circumferential portion which opens into the inclined portion of the guide groove, and wherein, during connecting, the angular stroke around the longitudinal axis of the guide pin in the circumferential portion corresponds to the angular stroke around the longitudinal axis of the connecting pin in the inclined intermediate portion of the connecting groove and to the movement of the ring with respect to the male body from a first longitudinal position, where the ring and the male body do not engage in a sealed manner, to a second longitudinal position, where the ring and the male body engage in a sealed manner via the seal.

3. The coupling according to claim 1, wherein the male body comprises at least one ring of balls interposed between the inner male body and the outer male body for the relative freedom of rotation of the inner male body and outer male body around the central longitudinal axis.

4. The coupling according to claim 1, wherein the seal comprises a U-shaped polymer body and a reinforcement radially mounted between the two legs of the U-shape, the U-shape being open towards the rear of the connecting element among the male or female element wherein the seal is housed.

5. The coupling according to claim 1, wherein the connecting pin extends behind a front face of the ring.

6. The coupling according to claim 5, wherein the connecting pin extends set back from the front face of the ring by a longitudinal distance greater than 0.6 times an inner diameter of the female body delimiting the receiving volume of the male body in the female element.

7. The coupling according to claim 1, wherein the ring comprises a drive pin arranged set back from a front face of the ring, this drive pin being engaged in the connecting groove for fixing the outer male body to the ring in rotation around the central longitudinal axis during connecting and in the connected configuration, wherein the seal is housed in the male body and engages with an outer radial surface of the ring in a connected configuration and wherein a longitudinal distance between the drive pin and a front face of the outer radial surface of the ring is smaller than a longitudinal distance between the seal and a front face of the outer male body.

8. The coupling according to claim 1, wherein in the disconnected configuration of the coupling, the or each locking device is in the release position, and wherein the release position is a stable position.

9. The coupling according to claim 1, wherein the locking device is arranged in an orthoradially extending groove of the female body, passing through the female body, and wherein the female body comprises an operating device arranged outside the female body for controlling the movement of the locking device from the locking position to the release position.

10. The coupling according to claim 1, wherein the or each locking device is integral with the female body in rotation around the longitudinal axis, wherein the or each locking device is in contact, in the locking position, with a flat of the ring which is recessed from an outer radial surface of the ring, and wherein, in the release position, the or each locking device is entirely disposed outside a cylindrical volume delimited around the longitudinal axis by this outer radial surface.

11. The coupling according to claim 10, wherein the locking device is a rod which comprises a notch recessed in an outer surface of the rod and wherein the rod is rotatable with respect to the female body around an axis inclined with respect to a longitudinal direction, between the release position, wherein the notch faces the ring and does not interfere with the rotation of the ring, and the locking position, wherein the outer surface of the rod is in contact with the flat of the ring.

12. The coupling according to claim 1, wherein the locking device is integral with an operating device formed by a lever, which is rotatable with respect to the female body between the release position and the locking position of the locking device and comprising two flanges arranged in a clevis around the female body.

13. The coupling according to claim 12, wherein the female body forms an outer longitudinal shoulder engaging with an inner shoulder of the lever in the locking position to slow down the movement of the lever towards the release position of the locking device.

14. The coupling according to claim 1, wherein the male element comprises a valve pushed back by a spring towards a position closing the inner duct of the male element, wherein, during connecting, this valve is moved by the piston towards a position opening the inner duct of the male element, and wherein a terminal notch of the guide groove, wherein the guide pin is engaged in the connected configuration, is configured such that the movement of the piston has a longitudinal overtravel between its open position in the connected configuration and its closed position.

15. The coupling according to claim 1, wherein the guide pin radially passes through a longitudinal groove of the ring wherein the guide pin and the ring engage for longitudinal sliding of the ring with respect to the piston, this longitudinal groove opening out at the rear of the ring.

16. The coupling according to claim 1, wherein the male outer body comprises inner radial surfaces which are stepped, and wherein the ring comprises outer radial surfaces which are stepped in such a way that during connecting the stepped outer radial surfaces and the stepped inner radial surfaces engage in pairs.

* * * * *